US008239673B2

(12) United States Patent
Shankar et al.

(10) Patent No.: US 8,239,673 B2
(45) Date of Patent: Aug. 7, 2012

(54) METHODS, APPARATUS AND SYSTEMS WITH LOADABLE KERNEL ARCHITECTURE FOR PROCESSORS

(75) Inventors: Narendar Shankar, Dallas, TX (US); Erdal Paksoy, Richardson, TX (US); Steven C. Goss, Rockwall, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1319 days.

(21) Appl. No.: 11/100,689

(22) Filed: Apr. 7, 2005

(65) Prior Publication Data
US 2005/0268092 A1   Dec. 1, 2005

Related U.S. Application Data

(60) Provisional application No. 60/561,133, filed on Apr. 8, 2004.

(51) Int. Cl.
*H04L 29/06* (2006.01)
*G06F 11/30* (2006.01)
*G06F 7/04* (2006.01)

(52) U.S. Cl. ........ 713/164; 713/162; 713/165; 713/189; 713/193; 726/9; 726/10

(58) Field of Classification Search .................. 713/189, 713/162, 164, 165, 193; 726/9, 10
See application file for complete search history.

(56) References Cited

U.S. PATENT DOCUMENTS

| 5,901,225 | A | * | 5/1999 | Ireton et al. ........................ 714/7 |
| 5,974,549 | A | * | 10/1999 | Golan .............................. 726/23 |
| 6,397,331 | B1 | * | 5/2002 | Ober et al. .................... 713/164 |
| 6,631,472 | B2 | | 10/2003 | Kaplan et al. |
| 6,769,059 | B1 | | 7/2004 | Qureshi et al. |
| 6,996,699 | B2 | * | 2/2006 | Chrysanthakopoulos et al. .............................. 712/35 |
| 7,024,555 | B2 | * | 4/2006 | Kozuch et al. .................... 726/22 |
| 2002/0138757 | A1 | * | 9/2002 | Lynn et al. ..................... 713/201 |
| 2003/0163723 | A1 | * | 8/2003 | Kozuch et al. ................ 713/200 |
| 2006/0100010 | A1 | * | 5/2006 | Gatto et al. ..................... 463/29 |

OTHER PUBLICATIONS

Baron, Max, "Five Chips from TI—Or, Is It Six?", Microprocessor Report, Mar. 17, 2003, pp. 1-6, Figs 1, 3-4.

* cited by examiner

*Primary Examiner* — Mohammad Reza
(74) *Attorney, Agent, or Firm* — Wade J. Brady, III; Frederick J. Telecky, Jr.

(57) ABSTRACT

A device (200, 2200) for improved security includes a processor (200) and a secure writeable memory (2245) coupled to said processor (200) and including code (2240) to download a loadable security kernel to the processor (200), authenticate the loadable security kernel, and transfer the kernel so that the kernel begins at a predetermined address inside the secure writeable memory (2245) only if the authentication is successful. A process (2400) of manufacturing a target communication device (2310) having a memory space having a secure writable portion (2245) of the memory space, the manufacturing process (2400) using a host machine (2330). The manufacturing process (2400) includes downloading (2540) the loadable security kernel from the host machine (2330) to the memory space at the target (2310). The loadable security kernel has a flashing entry point. The process also includes authenticating (2590) the downloaded loadable security kernel received at the target (2310), moving (2640) the loadable security kernel in the memory space provided the authenticating is successful (2610), wherein after the moving (2640) the loadable security kernel is in the secure writable portion (2245) of the memory space; and jumping (2650) to a predetermined location in the secure writable portion of the memory space, the predetermined location coinciding with the flashing entry point of the security kernel as moved.

13 Claims, 14 Drawing Sheets

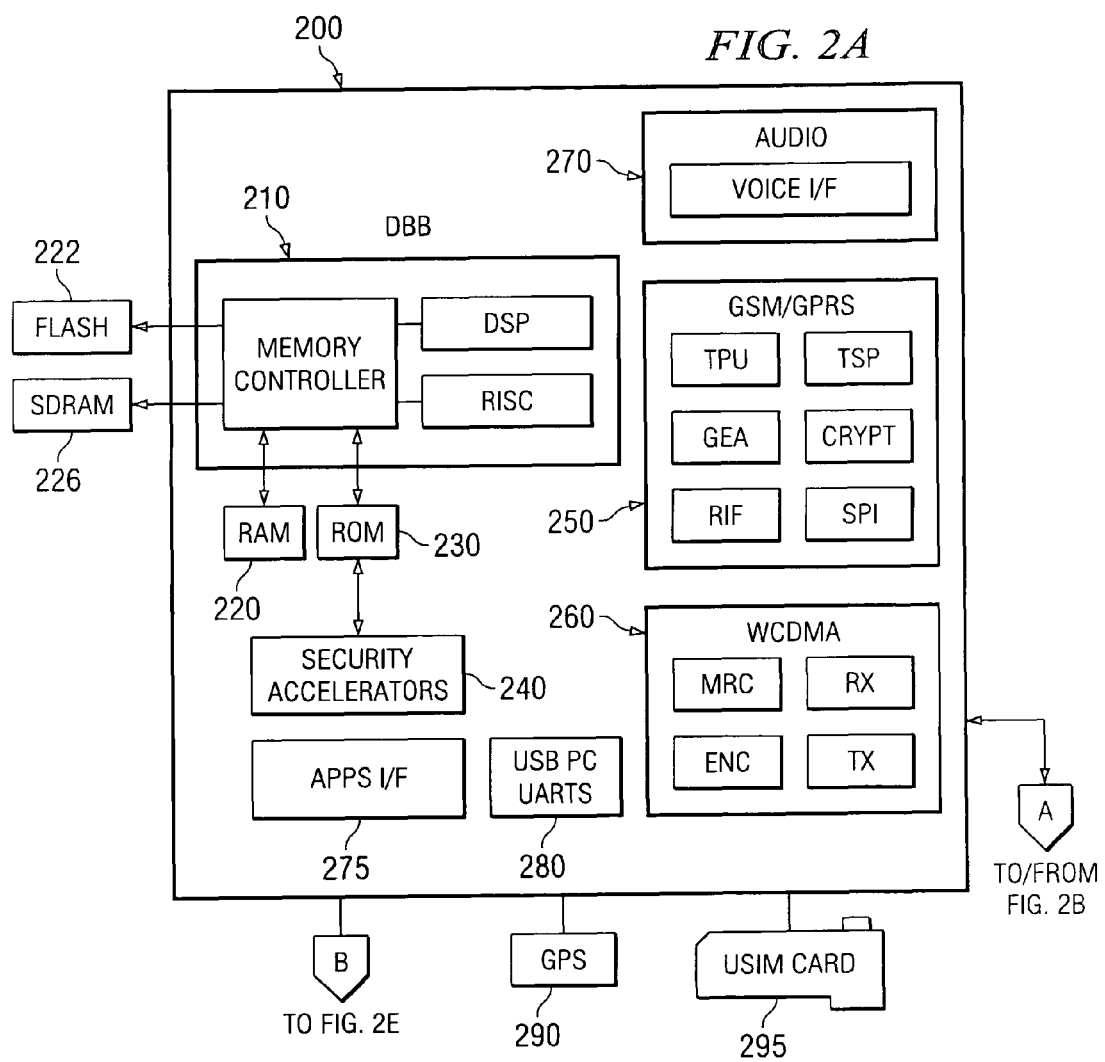

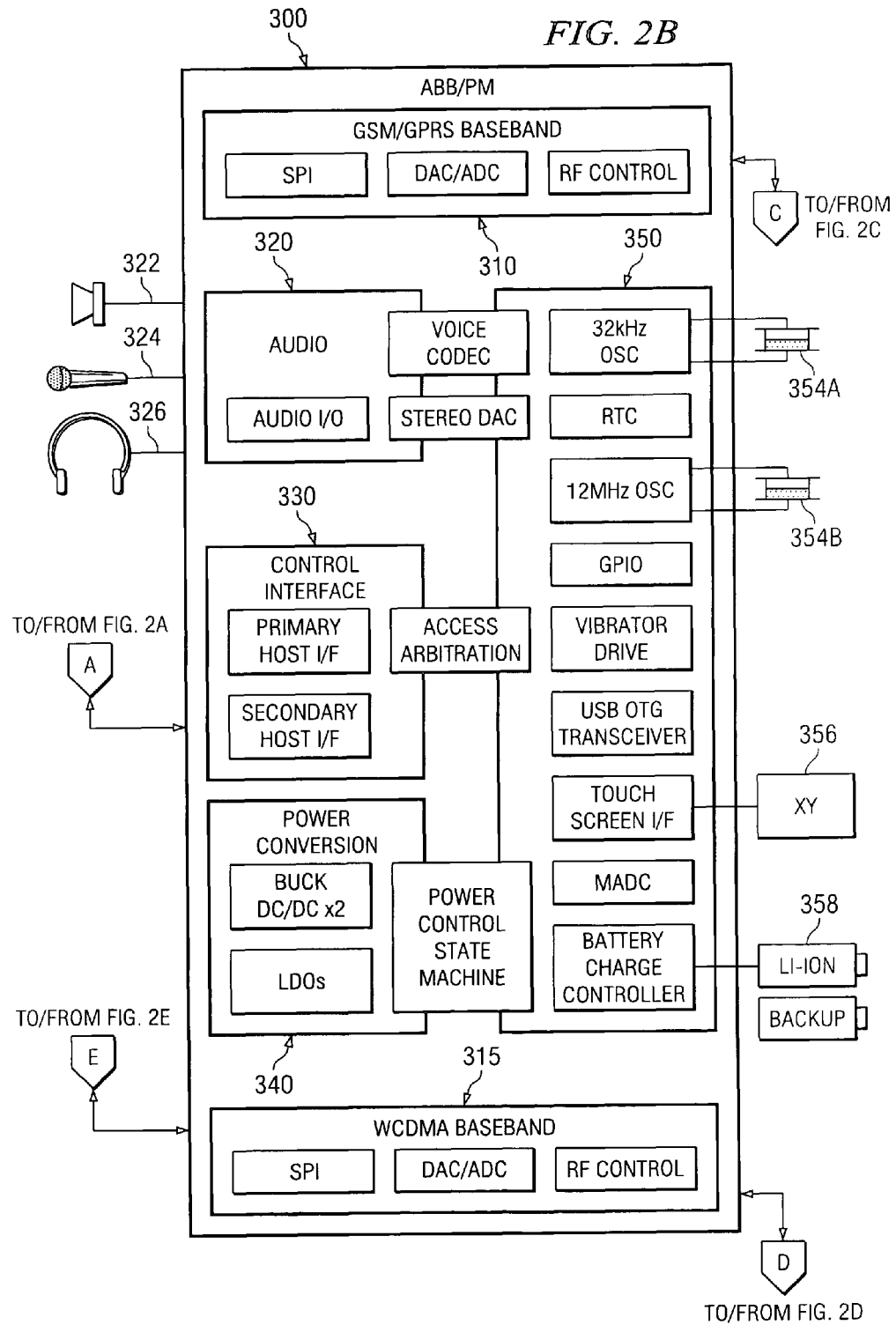

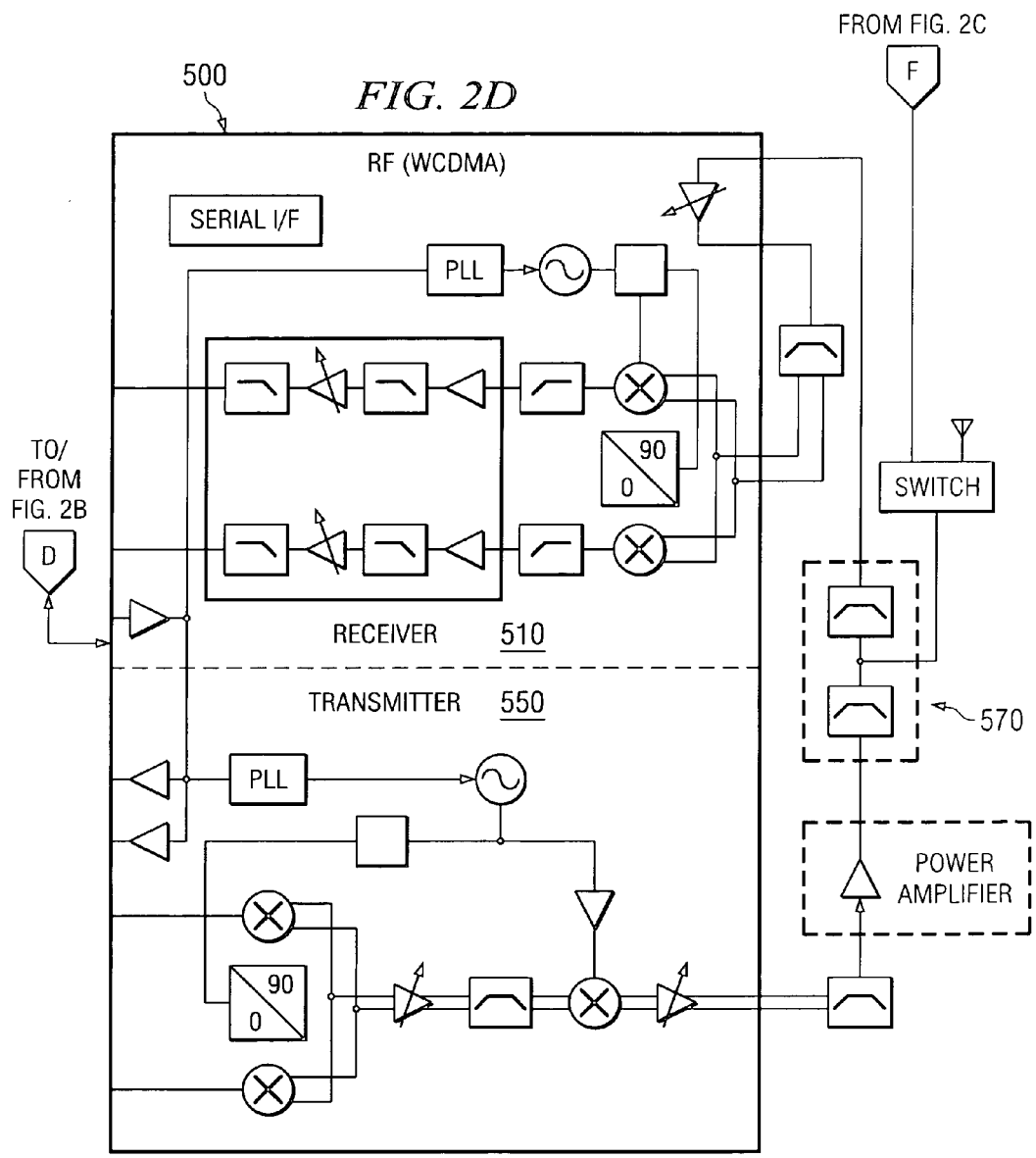

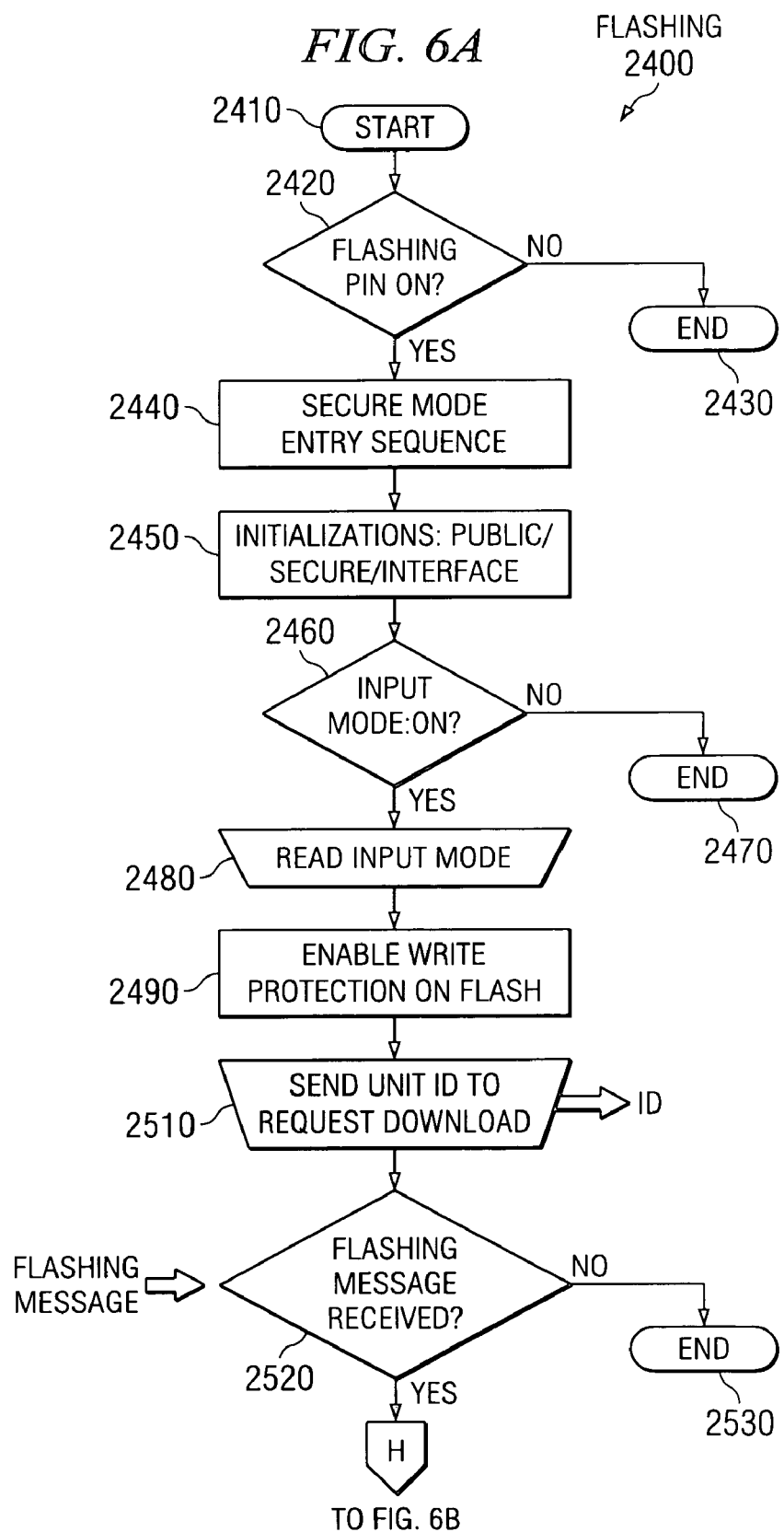

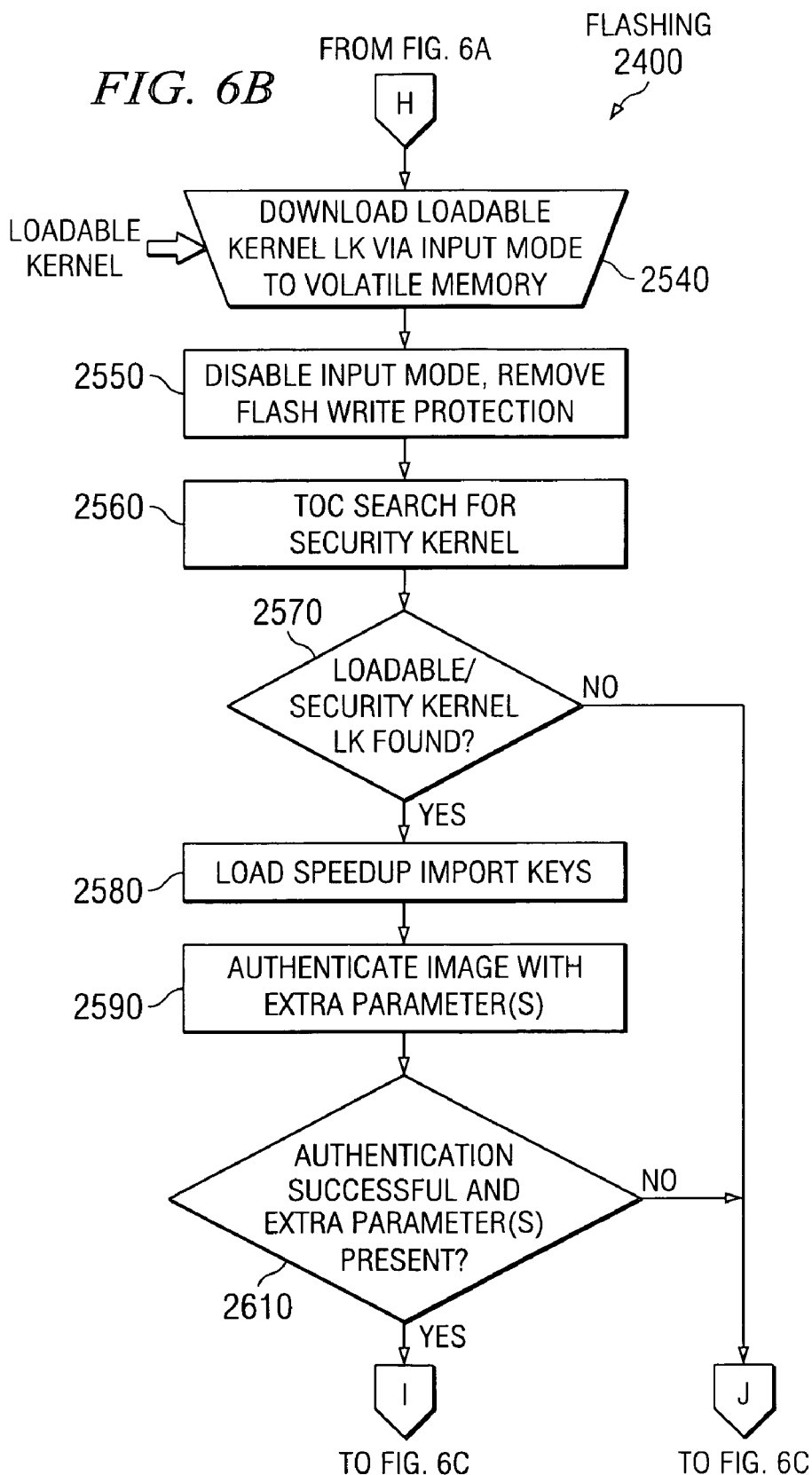

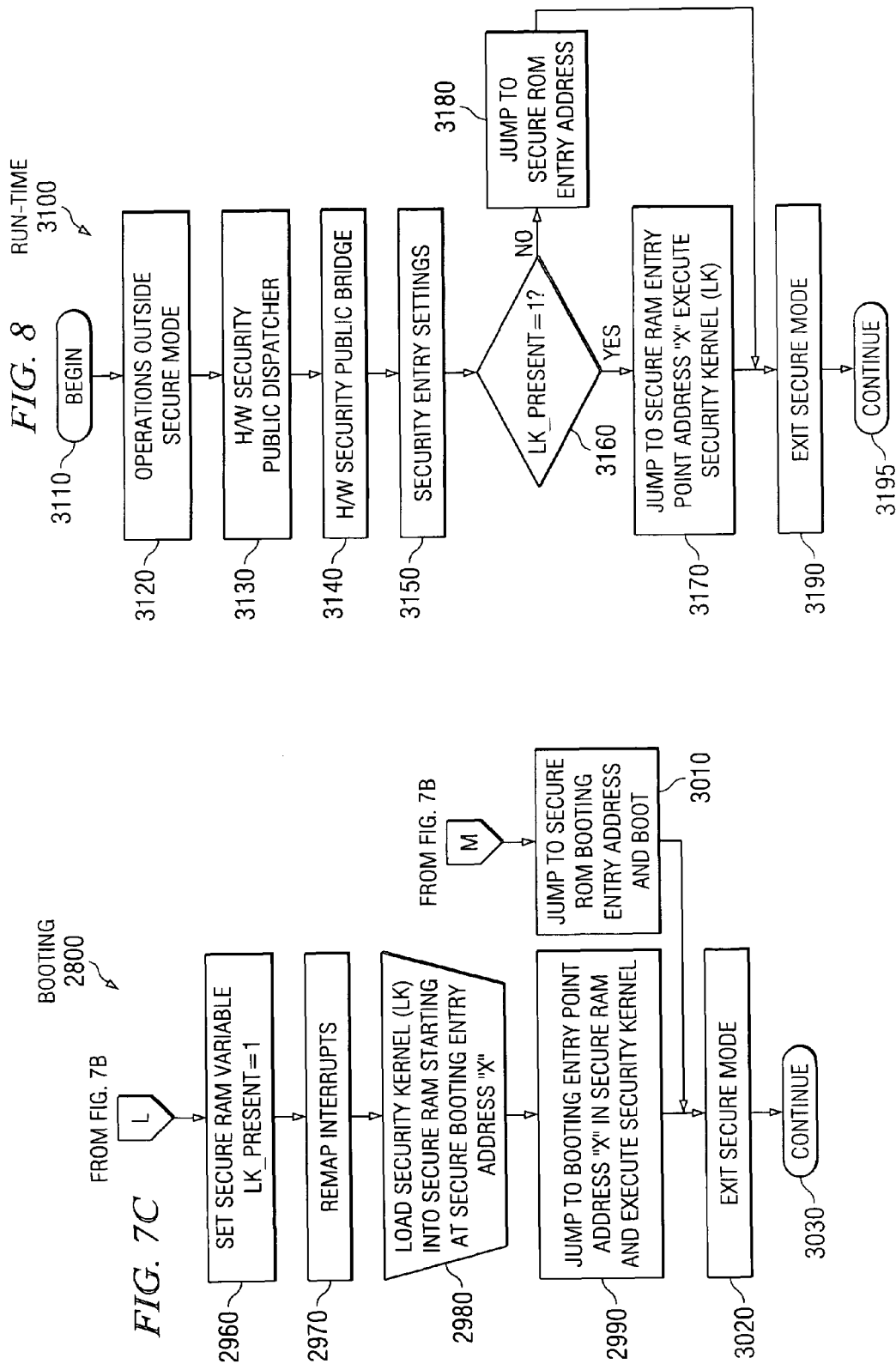

METHODS, APPARATUS AND SYSTEMS WITH LOADABLE KERNEL ARCHITECTURE FOR PROCESSORS

CROSS-REFERENCE TO RELATED APPLICATIONS

This application claims the benefit of the filing date of provisional application TI-38212PS, U.S. Ser. No. 60/561,133, filed Apr. 8, 2004, entitled "Methods, Apparatus, and Systems with Loadable Kernel Architecture for Processors" to Narendar Shankar, Erdal Paksoy and Steven C. Goss.

STATEMENT REGARDING FEDERALLY SPONSORED RESEARCH OR DEVELOPMENT a. Not applicable.

BACKGROUND OF THE INVENTION

This invention is in the field of information and communications, and is more specifically directed to improved processes, circuits, devices, and systems for varied levels of security and other information and communication processing purposes, and processes of making them. Without limitation, the background is further described in connection with wireless communications processing.

Wireless communications, of many types, have gained increasing popularity in recent years. Among other types of mobile equipment (ME), the mobile wireless (or "cellular") telephone has become ubiquitous around the world. Mobile telephony has recently begun to communicate video and digital data, in addition to voice. Wireless modems, for communicating computer data over a wide area network, using mobile wireless telephone channels and techniques are also available.

Wireless data communications in wireless local area networks (WLAN), such as that operating according to the well-known IEEE 802.11 standard, has become especially popular in a wide range of installations, ranging from home networks to commercial establishments. Short-range wireless data communication according to the "Bluetooth" technology permits computer peripherals to communicate with a personal computer or workstation within the same room. Numerous other wireless technologies exist and are emerging.

Security techniques are used to improve the security of retail and other business commercial transactions in electronic commerce and to improve the security of communications wherever personal and/or commercial privacy is desirable. Security is important in both wireline and wireless communications.

Processors of various types, including digital signal processing (DSP) chips and/or other integrated circuit devices are important to these systems and applications. Reducing the cost of manufacture and providing a variety of circuit and system products with performance features for different market segments are important goals in DSPs, integrated circuits generally and system-on-a-chip (SOC) design.

Coassigned U.S. Patent Application Publication 2004/0025010 of J. Azema, E. Balard, A. Chateau, E. Paksoy, and M. Leclercq, describes a computing platform that binds system firmware to a particular computing platform using a manufacturer certificate. A die identification number associated with an individual device is stored in a fused memory array (eFuse) at the time of manufacture and can be compared with the manufacturer certificate to bind the code to the platform.

Further alternative, improved and otherwise advantageous solutions are desirable in the art.

SUMMARY OF THE INVENTION

Generally and in one form of the invention, a device for improved security includes a processor and a secure writeable memory coupled to said processor and including code to download a loadable security kernel to the processor, authenticate the loadable security kernel, and transfer the kernel so that the kernel begins at a predetermined address inside the secure writeable memory only if the authentication is successful.

Generally, another form of the invention involves a method for improved security for a processor having a secure writeable memory includes downloading a loadable security kernel to the processor, authenticating the loadable security kernel, and transferring the kernel so that the kernel begins at a predetermined address inside the secure writeable memory only if the authentication is successful.

Generally, a further form of the invention involves a process of manufacturing a target communication device having a memory space having a secure writable portion of the memory space, the manufacturing process using a host machine. The manufacturing process includes downloading the loadable security kernel from the host machine to the memory space at the target. The loadable security kernel has a flashing entry point. The process also includes authenticating the downloaded loadable security kernel received at the target, moving the loadable security kernel in the memory space provided the authenticating is successful, wherein after the moving the loadable security kernel is in the secure writable portion of the memory space; and jumping to a predetermined location in the secure writable portion of the memory space, the predetermined location coinciding with the flashing entry point of the security kernel as moved.

Other forms of the invention involving processes of manufacture, processes of operation, circuits, devices, wireless communications products, wireless handsets and systems are disclosed and claimed.

BRIEF DESCRIPTION OF THE DRAWINGS

FIGS. 2A-2G are block diagrams of inventive integrated circuit chips for use in the blocks of the communications system of FIG. 1.

FIG. 2A is a block diagram of an integrated circuit including a digital baseband section, the integrated circuit provided on a printed circuit board system of integrated circuit chips for use in one or more of the system blocks of FIG. 1.

FIG. 2B is a block diagram of an integrated circuit including an analog baseband section, the integrated circuit provided on a printed circuit board system of integrated circuit chips for use in one or more of the system blocks of FIG. 1.

FIG. 2C is a block diagram of an integrated circuit including a GSM/GPRS RF (radio frequency) unit, the integrated circuit on a printed circuit board system of integrated circuit chips for use in one or more of the system blocks of FIG. 1.

FIG. 2D is a block diagram of an integrated circuit including a WCDMA (wideband code division multiple access) RF (radio frequency) unit, the integrated circuit on a printed circuit board system of integrated circuit chips for use in one or more of the system blocks of FIG. 1.

FIGS. 2E and 2F are two halves of a block diagram of an integrated circuit including application processor circuitry, the integrated circuit provided with off-chip peripherals on a printed circuit board system of integrated circuit chips for use in one or more of the system blocks of FIG. 1.

FIG. 2G is a block diagram of a WLAN integrated circuit including MAC (media access controller), PHY (physical layer) and AFE (analog front end), the integrated circuit on a printed circuit board system of integrated circuit chips for use in one or more of the system blocks of FIG. 1.

FIGS. 6A, 6B, 6C are three consecutive portions of a flow diagram of a manufacturing process involving a flashing process for use in manufacturing the target systems and processors of FIGS. 1, 2A-2G, 3, 4 and 5.

FIGS. 7A, 7B, 7C are three consecutive portions of a flow diagram of a booting process for use in operating the target systems and processors of FIGS. 1, 2A-2G, 3, 4 and 5.

FIG. 8 is a flow diagram of a run-time process for use in operating the target systems and processors of FIGS. 1, 2A-2G, 3, 4 and 5.

Corresponding numerals designate corresponding parts in the drawings except where the context indicates otherwise.

DETAILED DESCRIPTION OF EMBODIMENTS

Figure 1:
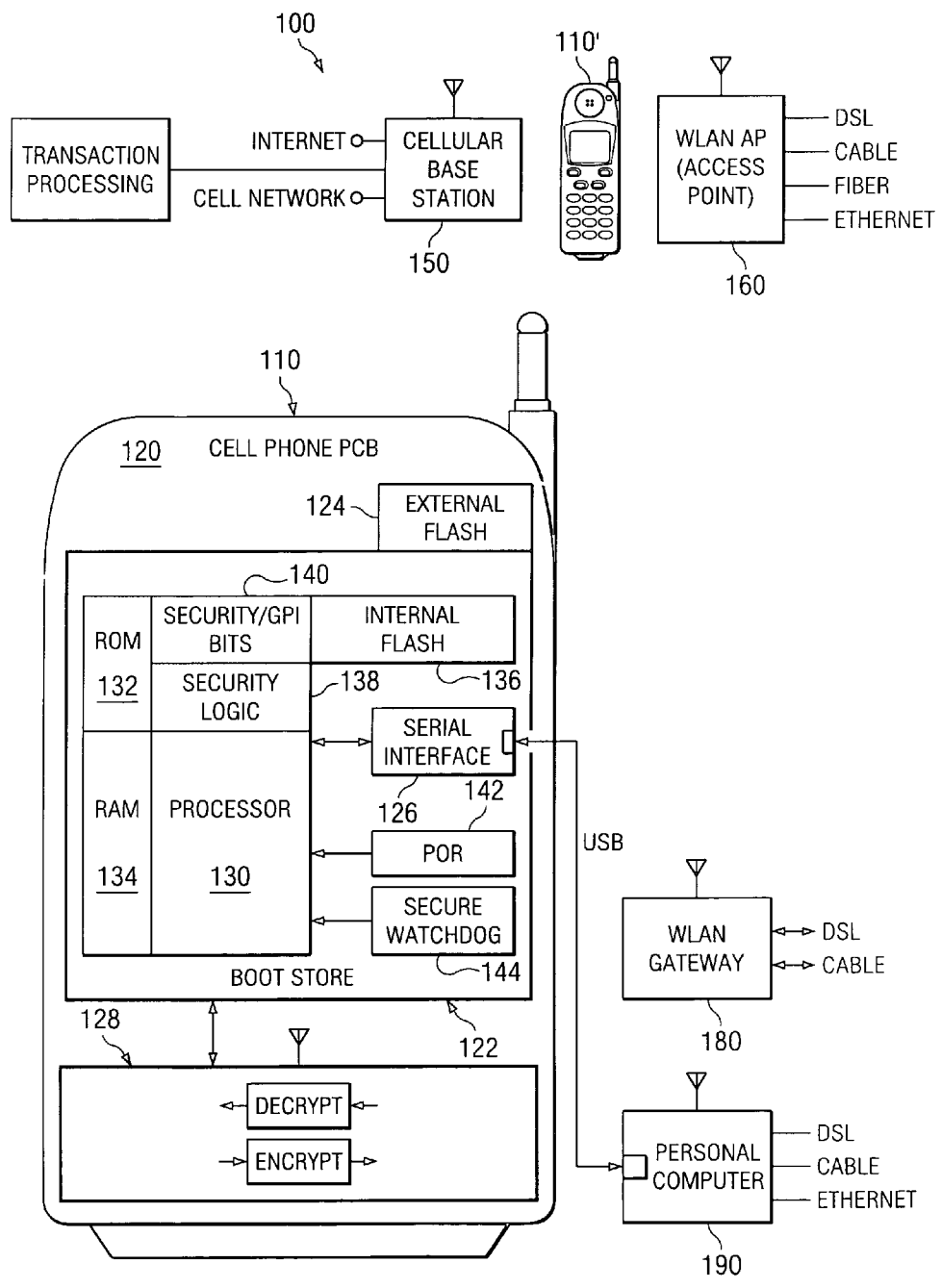
FIG. 1 is a pictorial diagram of a communications system including system blocks, for example a cellular base station, a WLAN AP (wireless local area network access point), a WLAN gateway, a personal computer, and two cellular telephone handsets, any one, some or all of the foregoing improved according to the invention.

In FIG. 1 an improved communications system 100 has system blocks with selectively-determinable security level. Any or all of the system blocks, such as cellular telephone and data handsets 110 and 110', a cellular (telephony and data) base station 150, a WLAN AP (wireless local area network access point, IEEE 802.11 or otherwise) 160, a WLAN gateway 180, and a personal computer (PC) 190, communicate with each other in communications system 100. Each of the system blocks 110, 110', 150, 160, 180, 190 are provided with one or more PHY physical layer blocks and interfaces as selected by the skilled worker in various products, for DSL (digital subscriber line broadband over twisted pair copper infrastructure), cable (DOCSIS and other forms of coaxial cable broadband communications), fiber (fiber optic cable to premises), and Ethernet wideband network. Cellular base station 150 two-way communicates with the handsets 110, 110', and with the Internet, with cellular communications networks and with PSTN (public switched telephone network). Cellular base station 150 locally and/or remotely interfaces with Transaction Processing to support secure commercial content, secure financial services, and other services over cellular telephone networks, over the Internet and on other networks.

In this way advanced networking capability for services and content, such as cellular telephony and data, audio, music, voice, video, e-mail, e-commerce, file transfer and other data services, internet, world wide web browsing, TCP/IP (transmission control protocol/Internet protocol), voice over packet and voice over Internet protocol (VoP/VoIP), and other services accommodates and provides security for secure utilization and enjoyment appropriate to the just-listed and other particular applications, while recognizing market demand for different levels of security. The embodiments, applications and system blocks disclosed herein are suitably implemented are suitably implemented in fixed, portable, mobile, automotive, seaborne, and airborne, communications, control, and other apparatus.

For example, handset 110 is improved for selectively determinable security and economy when manufactured. Handset 110 remains interoperable and able to communicate with all other similarly improved and unimproved system blocks of communications system 100. On a cell phone printed circuit board (PCB) 120 in handset 110, there is provided a higher-security processor integrated circuit 122, an external flash memory 124, and a serial interface 126. Serial interface 126 is suitably a wireline interface, such as a USB interface connected by a USB line to the personal computer 190 when the user desires and for reception of software intercommunication and updating of information between the personal computer 190 (or other originating sources external to the handset 110) and the handset 110. Such intercommunication and updating also occur via a lower-security processor such as for cellular modem, WLAN, Bluetooth, or other wireless or wireline modem processor and physical layer (PHY) circuitry 128.

Processor integrated circuit 122 includes at least one processor (or central processing unit CPU) block 130 coupled to an internal (on-chip read-only memory) ROM 132, an internal (on-chip random access memory) RAM 134, and an internal (on-chip) flash memory 136. A security logic circuit 138 is coupled to secure-or-general-purpose-identification value (Security/GPI) bits 140 of a non-volatile one-time alterable Production ID register or array of electronic fuses (E-Fuses). Such E-Fuses are an example of an identification code storage holding an identification value. These E-Fuses are programmed in different units of the handset 110, 110' to thereby provide a security identification store having non-volatile bits representing whether the wireless handset (or other system block) is a less secure ("GP" herein) type or more high-security type ("HS" herein). Depending on the Security/GPI bits 140, boot code residing in ROM 132 responds differently to a Power-On Reset (POR) circuit 142 and to a secure watchdog circuit 144 coupled to processor 130. A device-unique secret key is suitably also provided in the E-fuses or downloaded to other non-volatile, difficult-to-alter parts of the cell phone unit 110.

It will be noted that the words "internal" and "external" as applied to a circuit or chip respectively refer to being on-chip or off-chip of the applications processor chip 122. All items are assumed to be internal to an apparatus (such as a handset, base station, access point, gateway, PC, or other apparatus) except where the words "external to" are used with the name of the apparatus, such as "external to the handset."

ROM 132 provides a boot storage having boot code that is executable in different boot sequences. One or more of RAM 134, internal flash 136, and external flash 124 are also suitably used to supplement ROM 132 for boot storage purposes. Processor 130 is an example of circuitry coupled to the identification code storage 140 to execute a selected boot sequence from the boot code in the boot storage either for more-secure operation or for less-secure operation of the processor.

Processor 130 is also responsive to one or more other inputs to execute further selected boot sequences from the boot code, or boot modes in a boot sequence. These other inputs are suitably provided by hardware on the PCB 120 connecting to a boot mode input pin of chip 122, configuration values stored in ROM 132 or other memories, and by the power-on reset circuit POR 142. Further, the boot code in the boot storage suitably includes code that loads software external to the wireless handset via the wireless interface(s) 128 and/or the serial interface 126 into external flash memory 124 and internal flash memory 136 depending on the selected boot sequence.

Processor 130 is coupled to the on-chip boot ROM 132, to the power-on reset circuit 142 and to the security identification bits 140 to selectively execute boot code depending on the non-volatile information of the security identification bits 140. Processor 130 is responsive to a security identification value represented by the bits 140 to recognize boot code and modem software code that is intended for that particular unit 110—in other words, "device bound."

A secure watchdog circuit 144 automatically counts down to zero and hard-resets the circuitry 122, 124 unless properly-operating software in the cellular telephone 110 periodically reloads the watchdog counter to prevent it from reaching zero. In this way, many software errors and much security hacking are minimized and obviated.

FIGS. 2A-2G illustrate inventive integrated circuits for use in the blocks 110, 110', 150, 160, 180, 190 of the communications system 100 of FIG. 1. The skilled worker uses, replicates and adapts the integrated circuits to the particular parts of the communications system 100 as appropriate to the functions intended. For conciseness of description and without limitation, the integrated circuits are described with particular reference to use of all of them in the cellular telephone handsets 110 and 110' by way of example. Also, the architecture of integrated circuit 122 is suitably incorporated into one or more of integrated circuit 200 of FIG. 2A, integrated circuit 600 of FIGS. 2E and 2F, and integrated circuit 800 of FIG. 2G, for instance.

It is contemplated that the skilled worker uses each of the integrated circuits shown, or such selection from the complement of blocks therein provided into appropriate other integrated circuit chips, in a manner optimally combined or partitioned between the chips, to the extent needed by any of the applications supported by the cellular telephone base station 150, personal computer(s) 190 equipped with WLAN, WLAN access point 160 and WLAN gateway 180, as well as radios and televisions, fixed and portable entertainment units, routers, pagers, personal digital assistants (PDA), organizers, scanners, faxes, copiers, household appliances, office appliances, combinations thereof, and other application products now known or hereafter devised in which increased, or decreased, selectively determinable security and economy of communication are desirable.

Figure 2C:
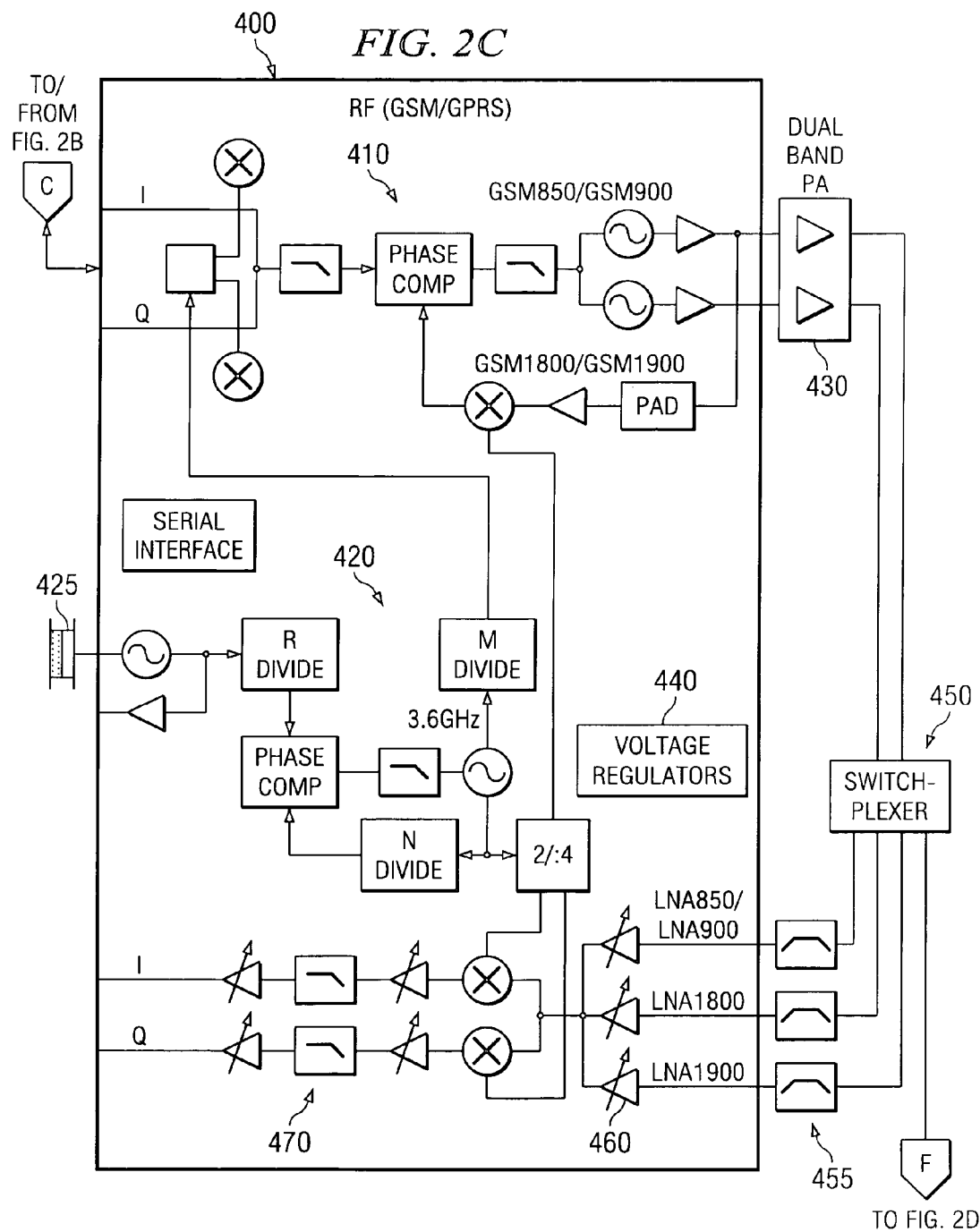

In FIG. 2A, an integrated circuit 200 includes a digital baseband (DBB) block 210 that has a RISC processor (such as MIPS core, ARM processor, or other suitable processor), a digital signal processor (DSP) such as from the TMS320C55x™ DSP generation from Texas Instruments Incorporated or other digital signal processor, and a Memory Controller interfacing the RISC and the DSP to a Flash memory 222 and a SDRAM (synchronous dynamic random access memory) 226. On chip RAM 220 and on-chip ROM 230 also are accessible to the processors via the memory controller. Security accelerators block 240 provide additional computing power such as for hashing and encryption that are accessible, for instance, when the integrated circuit 200 is operated in a security level enabling the security accelerators block 240 and affording types of access to the security accelerators depending on the security level and/or security mode. Digital circuitry 250 supports and provides interfaces for one or more of GSM, GPRS, EDGE, and UMTS (Global System for Mobile communications, General Packet Radio Service, Enhanced Data Rates for Global Evolution, Universal Mobile Telecommunications System) wireless, with or without high speed digital data service, via the analog baseband chip 300 of FIG. 2B and GSM chip 400 of FIG. 2C. Digital circuitry 250 includes ciphering processor CRYPT for GSM A51 and/or A52 ciphering or and/or other encryption/decryption purposes. Blocks TPU (Time Processing Unit real-time sequencer), TSP (Time Serial Port), GEA (GPRS Encryption Algorithm block for ciphering at LLC logical link layer), RIF (Radio Interface), and SPI (Serial Port Interface) are included in digital circuitry 250.

Digital circuitry 260 provides codec for CDMA (Code Division Multiple Access), CDMA2000, and/or WCDMA (wideband CDMA) wireless with or without an HSDPA (High Speed Downlink Packet Access) (or 1×EV-DV, 1×EV-DO or 3×EV-DV) data feature via the analog baseband chip 300 of FIG. 2B and the CDMA chip 500 of FIG. 2D. Digital circuitry 260 includes blocks MRC (maximal ratio combiner for multipath symbol combining), ENC (encryption/decryption), RX (downlink receive channel decoding, de-interleaving, viterbi decoding and turbo decoding) and TX (uplink transmit convolutional encoding, turbo encoding, interleaving and channelizing.). Block ENC has blocks for uplink and downlink supporting the F8 confidentiality algorithm and the F9 integrity algorithm of WCDMA or otherwise suitable encryption/decryption processes for the communications application.

Audio/voice block 270 supports audio, voice and voice-over-packet (VoP and/or VoIP) functions and interfacing. Applications interface block 275 couples the digital baseband 210 to an applications processor 600 of FIGS. 2E and 2F. Serial interface 280 interfaces from parallel on-chip digital busses to USB (Universal Serial Bus) of a PC (personal computer) 190. Serial interface 280 includes UARTs (universal asynchronous receiver/transmitter circuit) for performing the conversion of data between parallel and serial lines. Chip 200 is coupled to location-determining circuitry 290 for GPS (Global Positioning System), and to a USIM (UMTS Subscriber Identity Module) 295 or other SIM.

In FIG. 2B a mixed-signal integrated circuit 300 includes an analog baseband (ABB) block 310 for GSM/GPRS/EDGE/UMTS which includes SPI (Serial Port Interface), digital-to-analog/analog-to-digital conversion DAC/ADC block, and RF (radio frequency) Control pertaining to GSM/GPRS/EDGE/UMTS and coupled to RF (GSM etc.) chip 400 of FIG. 2C. Block 315 is an analogous ABB for CDMA, CDMA2000, and/or WCDMA wireless and/or any associated HSDPA data (or 1×EV-DV, 1×EV-DO or 3×EV-DV data and/or voice) with its respective SPI (Serial Port Interface), digital-to-analog conversion DAC/ADC block, and RF Control pertaining to said CDMA types and coupled to an RF chip 500 of FIG. 2D. An audio block 320 has audio I/O (input/output) circuits to a speaker 322, a microphone 324, and headphones 326. Audio block 320 is coupled to a voice codec and a stereo DAC (digital to analog converter), which in turn have the signal path coupled to the baseband blocks 310 and 315 with suitable encryption/decryption activated or not.

A control interface 330 has a primary host interface (I/F) and a secondary host interface to DBB-related integrated circuit 200 of FIG. 2A for the respective GSM and CDMA paths. The integrated circuit 300 is also interfaced via arrow E to the I2C port of applications processor chip 600 of FIG. 2E. Control interface 330 is also coupled via access arbitration circuitry to the interfaces in circuits 350 and the basebands 310 and 315. A power conversion block 340 includes buck voltage conversion circuitry for DC-to-DC conversion, and low-dropout (LDO) voltage regulators for power management/sleep mode of respective parts of the chip regulated by the LDOs. Power conversion block 340 provides information to and is responsive to a power control state machine shown between the power conversion block 340 and circuits 350.

Circuits 350 provide a 32 KHz oscillator and 12 MHz oscillator for clocking chip 300. The oscillators have frequencies determined by respective crystals 354A and 354B. Circuits 350 include a RTC real time clock (time/date functions), general purpose I/O input/output, a vibrator drive (supplement to cell phone ringing features), a USB On-The-Go (OTG) transceiver, and touch screen interface. A touch screen 356 off-chip is connected to the touch screen interface on-chip. Batteries such as a lithium-ion battery 358 and backup battery provide power to the system and battery data on suitably provided separate lines from the battery pack. When needed, the battery also receives charging current from the Battery Charge Controller in analog circuit 350 which includes MADC (Monitoring ADC and analog input multiplexer such as for on-chip charging voltage and current, and battery voltage lines, and off-chip battery voltage, current, temperature) under control of the power control state machine.

In FIG. 2C an RF integrated circuit 400 includes a GSM/GPRS/EDGE/UMTS RF transmitter block 410 supported by oscillator circuitry 420 with off-chip crystal 425. Transmitter block 410 is fed by baseband block 310 of FIG. 2B. Transmitter block 410 drives an off-chip dual band RF power amplifier (PA) 430. On-chip voltage regulators 440 maintain appropriate voltage under conditions of varying power usage. Off-chip switchplexer 450 couples to wireless antenna and switch circuitry in FIG. 2D and to both the transmit portion 410, 430 in FIG. 2C and the receive portion next described. Switchplexer 450 is coupled via band-pass filters 455 to receiving LNAs 460 (low noise amplifiers) for 850/900 MHz, 1800 MHz, 1900 MHz and other appropriate communication bands. Depending on the band in use, the output of LNAs 460 couples to GSM/GPRS/EDGE/UMTS demodulator 470 to produce the I/Q outputs thereof (in-phase, quadrature) to the GSM/GPRS/EDGE/UMTS baseband block 310 in FIG. 2B.

In FIG. 2D an integrated circuit 500 supports CDMA (code division multiple access), CDMA2000 and/or WCDMA (wideband CDMA), etc. at RF (radio frequency) in a receiver section 510 and a transmitter section 550. The cellular telephone antenna of the cellular telephone handset 110 couples to a switch unit SWITCH and bandpass filters 570 that in turn couple to the GSM circuits of FIG. 2C and the CDMA circuits of FIG. 2D. The receiver output lines at upper left and transmitter input lines at lower left are all coupled to the WCDMA/HSDPA baseband block 315 in FIG. 2B.

Figure 2E:
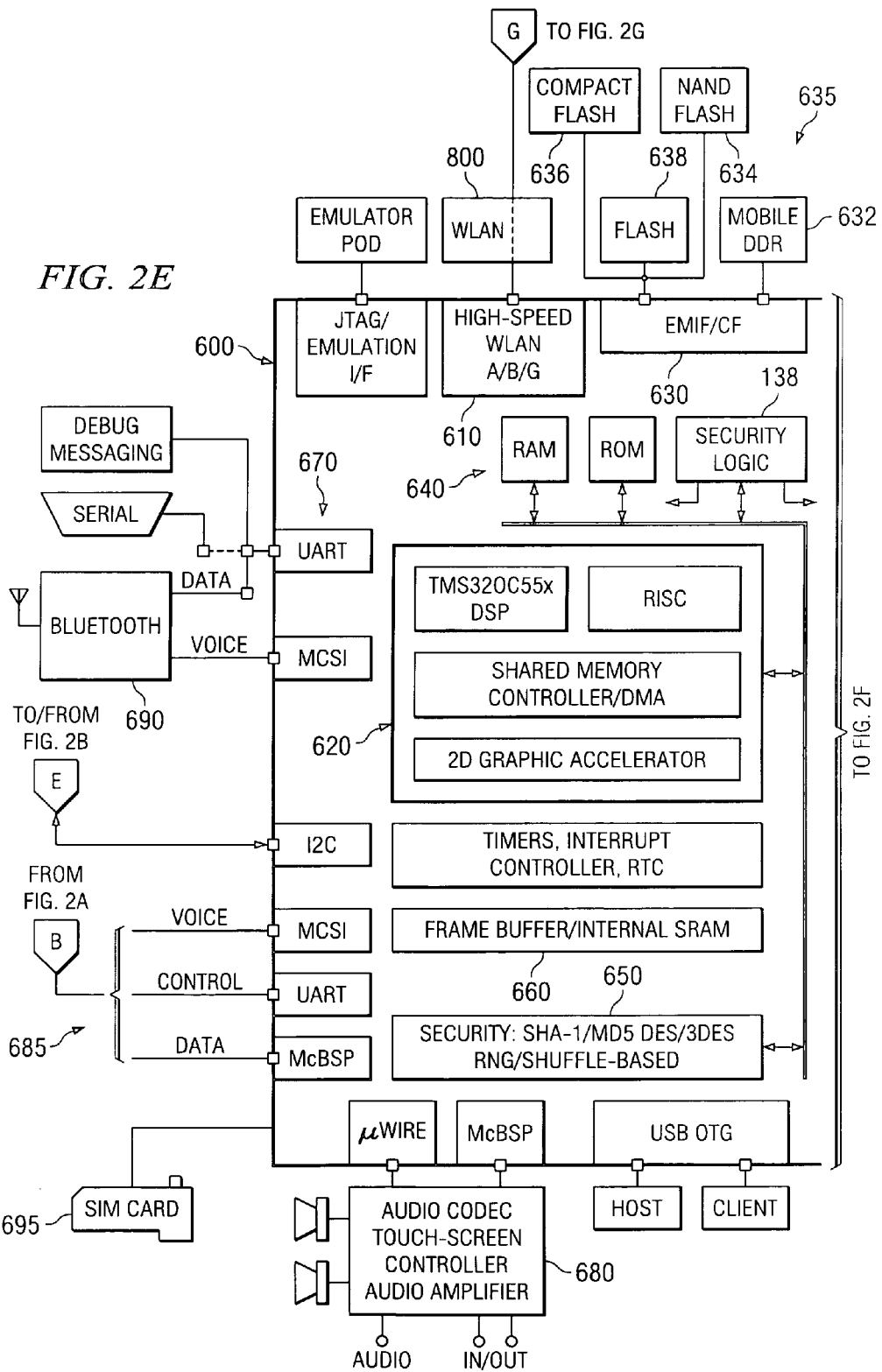
Figure 2F:
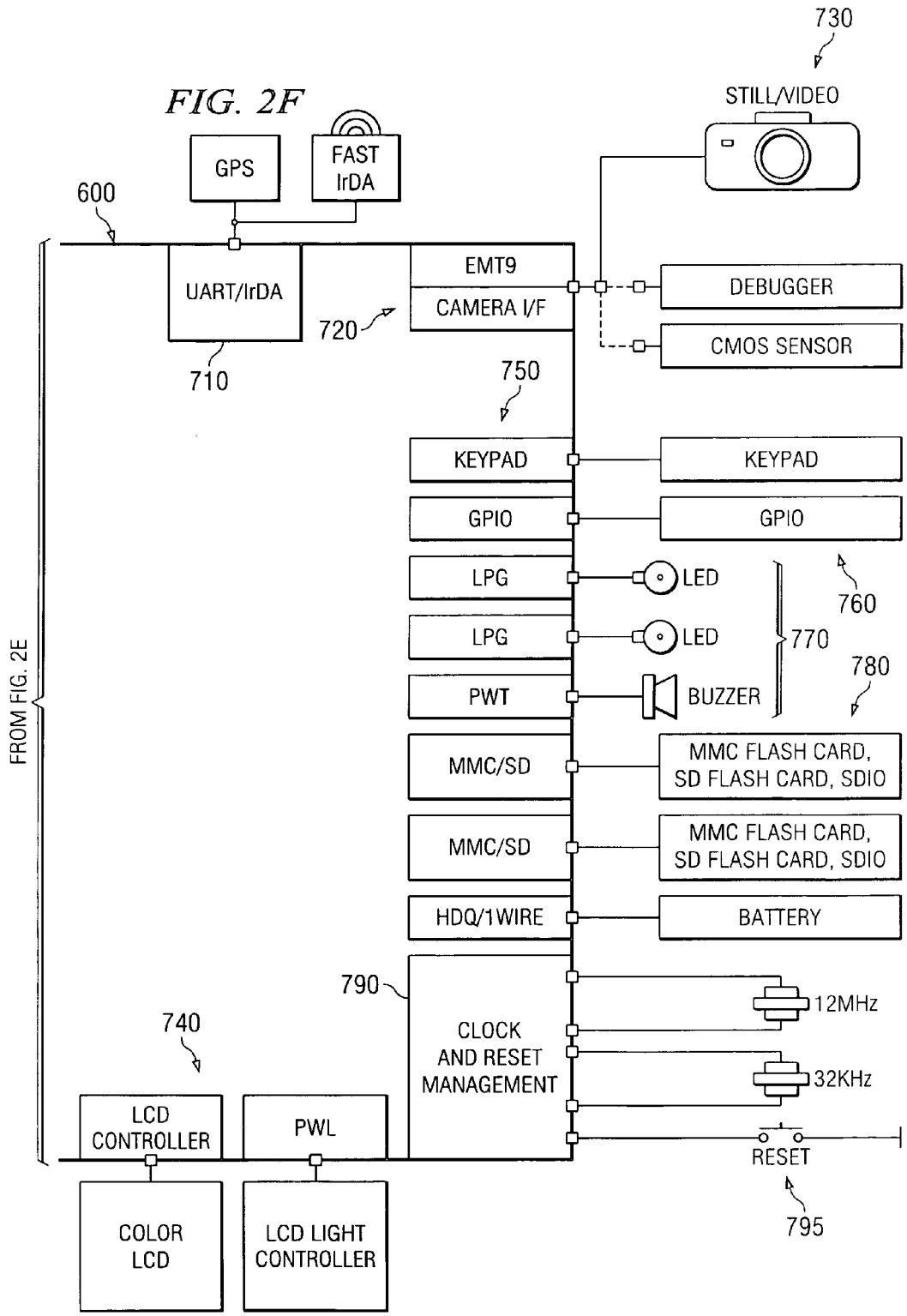

In FIGS. 2E and 2F are illustrated two halves of the block diagram of an integrated circuit chip 600 for applications (apps) processing and various off-chip peripherals. This apps processor is an example of a more-secure secure processor compared to less-secure modem processor 200 of FIG. 2A and WLAN processor 800 of FIG. 2G. This apps processor is suitably provided by an OMAP™ processor from Texas Instruments Incorporated or an apps processor from another manufacturer.

Figure 2G:
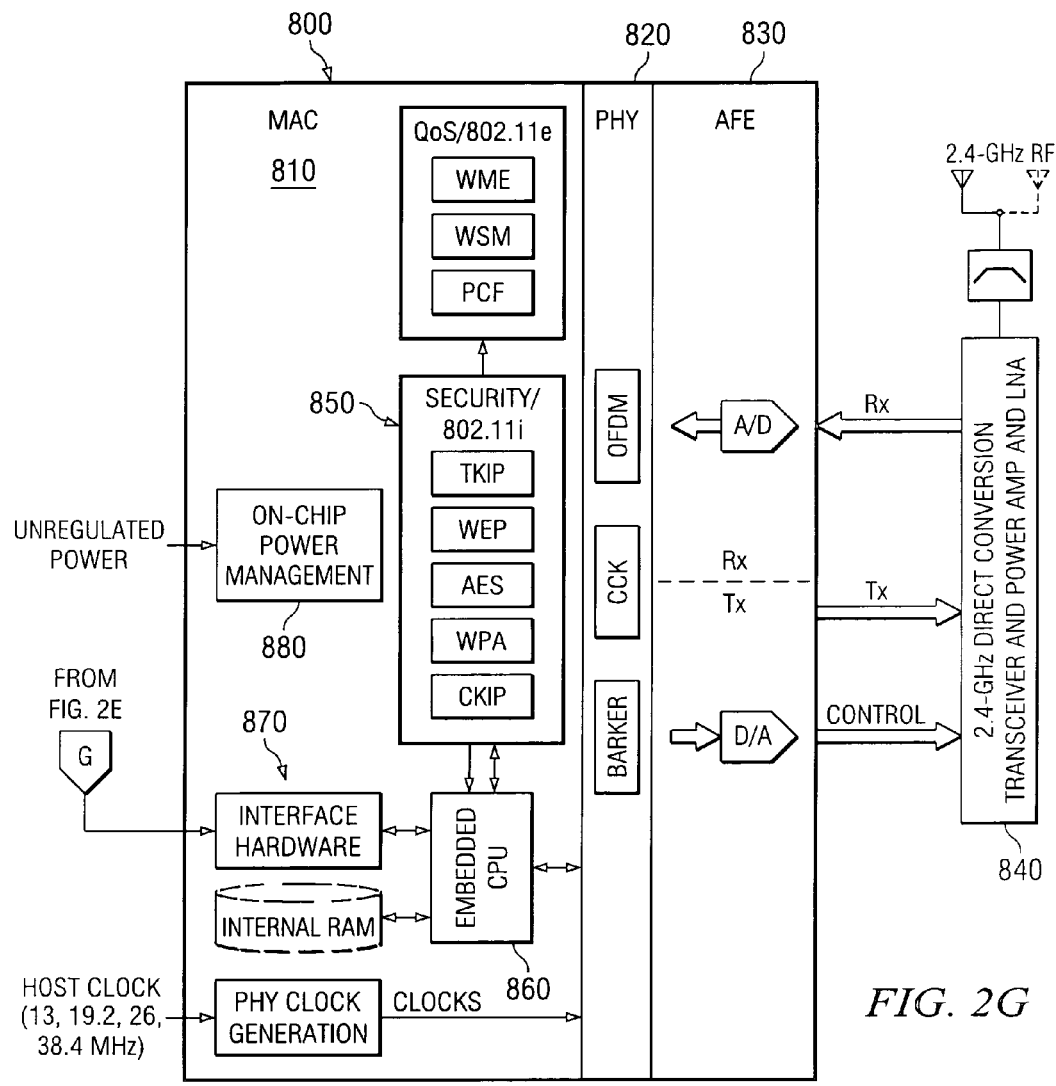

Beginning with FIG. 2E, on-chip are found a high-speed WLAN 802.11a/b/g interface circuit 610 coupled to a WLAN chip 800 of FIG. 2G.

Further provided on chip 600 of FIG. 2E is an applications processing section 620 which includes a RISC processor (such as MIPS core, ARM processor, or other suitable processor), a digital signal processor (DSP) such as from the TMS320C55x™ DSP generation from Texas Instruments Incorporated or other digital signal processor, and a shared memory controller with DMA (direct memory access), and a 2D (two-dimensional display) graphic accelerator. The RISC and the DSP have access via on-chip extended memory interface (EMIF/CF) 630 to off-chip memory resources 635 including as appropriate, SDRAM, mobile DDR (double data rate) DRAM, and flash memory of any of NAND Flash, NOR Flash, and Compact Flash. On-chip, the shared memory controller and DMA (direct memory access) in circuitry 620 interfaces the RISC and the DSP via on-chip bus to on-chip memory 640 with RAM and ROM. The 2D graphic accelerator is coupled to frame buffer internal SRAM (static random access memory) 660.

Figure 5:
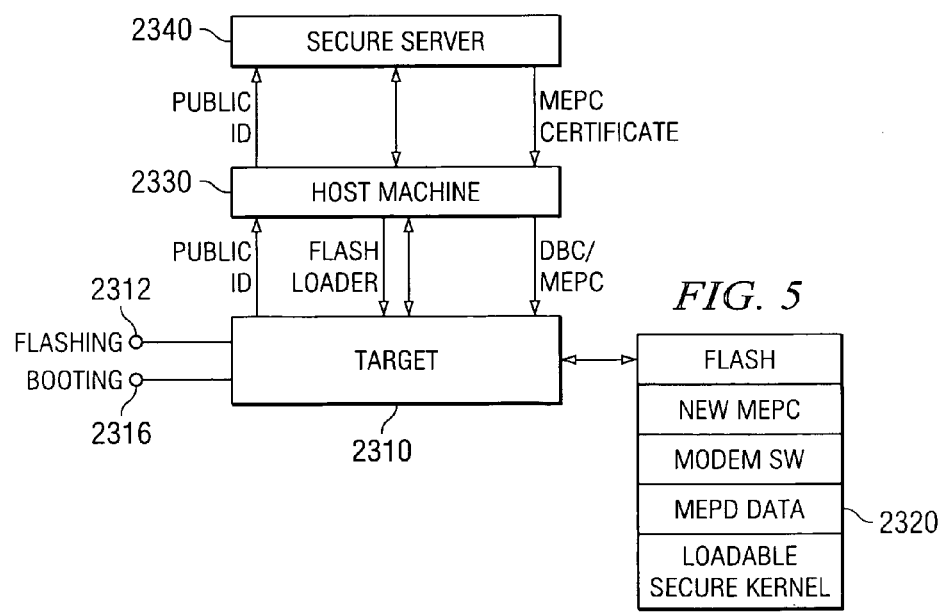
FIG. 5 is a block diagram of a system and process of manufacture of target devices such as cell phones with a loadable security kernel.

Security logic 138 of FIG. 1 and FIG. 2E includes hardware-based protection circuitry, also called security monitoring logic or a secure state machine 2260 of FIG. 5. Security logic 138 is coupled to and monitors busses and other parts of the chip for security violations and protects and isolates the protected areas. Security logic 138 makes secure ROM space inaccessible, makes a Security Control Register SECCTRL inaccessible, makes secure RAM space inaccessible and establishes any other appropriate protections to additionally foster security. In one embodiment such a software jump from flash to secure ROM, for instance, causes a security violation wherein, for example, the security logic 138 produces an automatic immediate reset of the chip. In another embodiment, such a jump causes the security monitoring logic to produce an error message and a re-vectoring of the jump away from secure ROM. Other security violations would include attempted access to Security Control Register SECCTRL or attempted access to secure RAM space.

Further in FIG. 2E, security block 650 includes secure hardware accelerators having security features and provided for accelerating encryption and decryption of any one or more types known in the art. A random number generator RNG is provided in security block 650. Among the Hash approaches are SHA-1 (Secured Hashing Algorithm), MD2 and MD5 (Message Digest version #). Among the symmetric approaches are DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard). Among the asymmetric approaches are RSA, DSA, DH, NTRU, and ECC (elliptic curve cryptography). The security features contemplated include any of the foregoing hardware and processes and/or any other known or yet to be devised security and/or hardware and encryption/decryption processes implemented in hardware or software.

Improvements are suitably implemented as described especially in connection with integrated circuit 122 of FIG. 1 and elsewhere herein as related to FIG. 2E processing section 620, security logic 138, security block 650, RAM and ROM 640, and EMIF/CF block 630 (Extended Memory Interface and Compact Flash Interface).

Further in FIG. 2E, on-chip peripherals 670 include UART data interface and MCSI (Multi-Channel Serial Interface) voice interface for off-chip Bluetooth short distance wireless circuit 690. Debug messaging and serial interfacing are also available through the UART. A JTAG emulation interface couples to an off-chip emulator for test and debug.

Further in peripherals 670 are an I2C interface to analog baseband ABB chip 300 of FIG. 2B, and an interface 685 to applications interface 275 of integrated circuit chip 200 having digital baseband DBB in FIG. 2A. Interface 685 includes a MCSI voice interface, a UART interface for controls, and a multi-channel buffered serial port (McBSP interface) for data. Timers, interrupt controller, and RTC (real time clock) circuitry are provided in chip 600.

Further in peripherals 670 are a MicroWire (u-wire 4 channel serial port) and multi-channel buffered serial port (McBSP interface) to off-chip Audio codec, a touch-screen controller, and audio amplifier 680 to stereo speakers. External audio content and touch screen (in/out) are suitably provided. Additionally, an on-chip USB OTG interface couples to off-chip Host and Client devices. These USB communications are suitably directed outside handset 110 such as to PC 190 (personal computer) and/or from PC 190 to update the handset 110.

A SIM (subscriber identification module) magnetic or smart integrated circuit card 695 is inserted into the cellular phone 110 and coupled to provide subscriber identification information directly to apps processor 600. In some embodiments, SIM card 695 is omitted and the information is suitably coupled from USIM 295 in FIG. 2A via lines 685 to apps processor 600 of FIG. 2E. In other embodiments where a SIM card is used, the USIM card 295 is omitted and SIM card 695 is directly coupled to apps processor 600.

Turning to FIG. 2F, chip 600 includes further interfaces and features. Note that the block diagram of FIGS. 2E and 2F is understood as providing on-chip peripheral bussing and couplings between the application processing circuitry 620 and the various on-chip peripheral blocks, regardless of whether the diagram lacks explicitly-shown busses and couplings, as is understood by the skilled worker.

An on-chip UART/IrDA (infrared data) interface 710 couples to off-chip GPS (global positioning system) and Fast IrDA infrared communications device. An interface 720 provides EMT9 and Camera interfacing to one or more off-chip still cameras or video cameras 730, and/or to a CMOS sensor of radiant energy, and/or to a debugger.

Further in FIG. 2F, an on-chip LCD controller and associated PWL (Pulse-Width Light) block 740 are coupled to a color LCD display and its LCD light controller off-chip. Further, on-chip interfaces 750 are respectively provided for off-chip keypad and GPIO 760, on-chip LPG (LED Light Emitting Diode Pulse Generator) and PWT (Pulse-Width Tone) interfaces are respectively provided for off-chip LED and buzzer peripherals 770. GPIO 760 has several chip pins for inputs.

On-chip MMC/SD multimedia and flash interfaces are provided for off-chip MMC Flash card, SD flash card and SDIO peripherals 780. An on-chip selectable-mode HDQ or 1-Wire (hardware protocols) battery monitoring serial interface module is provided for monitoring the off-chip Battery. On-chip Clock and Reset management circuitry 790 (coupled also to POR 142 of FIG. 1) is connected to off-chip 12 MHz and 32 KHz crystals and to a reset pushbutton switch 795.

In FIG. 2G, a WLAN integrated circuit 800 includes MAC (media access controller) 810, PHY (physical layer) 820 and AFE (analog front end) 830. PHY 820 includes blocks for BARKER coding, CCK, and OFDM. PHY 820 receives PHY Clocks from a clock generation block supplied with suitable off-chip host clock, such as at 13, 16.8, 19.2, 26, or 38.4 MHz. These clocks are often found in cell phone systems and the host application is suitably a cell phone or any other end-application.

AFE 830 is coupled by receive (Rx), transmit (Tx) and CONTROL lines to an off-chip WLAN RF circuitry 840. WLAN RF 840 includes a 2.4 GHz (and/or 5 GHz) direct conversion transceiver and power amplifier and has low noise amplifier LNA in the receive path. Bandpass filtering couples WLAN RF 840 to a WLAN antenna.

In MAC 810, Security circuitry 850 supports any one or more of various encryption/decryption processes such as WEP (Wired Equivalent Privacy), RC4, TKIP, CKIP, WPA, AES (advanced encryption standard), 802.11i and others.

The security circuitry and processes depicted in FIGS. 1, 3, 4, 5 and 6 are suitably provided by more-secure apps processor 600 and their benefits conferred on cellular modem processor 200 of FIG. 2A and/or conferred on WLAN security block 850 and WLAN processor 860 of FIG. 2G. In this way security of cellular telephone, data and video communications, voice-over-packet, and other voice, audio, video, financial, content and other services over all types of wireless and wireline physical layers (PHYs) are enhanced.

Further in FIG. 2G, processor 860 comprised of an embedded CPU (central processing unit) is connected to internal RAM and ROM and coupled to provide QoS (Quality of Service) IEEE 802.11e operations WME, WSM, and PCF (packet control function). Security block 850 in FIG. 2G has busing for data in, data out, and controls interconnected with CPU 860. Interface hardware 870 and internal RAM on-chip couples CPU 860 with (see FIG. 2E) interface 610 of applications processor integrated circuit 600 of FIG. 2E.

The description herein next turns to the considerations noted above and provides further detailed description. References to a "loadable kernel," "security kernel," "secure kernel," and "secure security kernel" refer to advantageous aspects of the same thing. "Security kernel" is used to indicate the improved security provided by the kernel. "Secure kernel" is used to indicate that the kernel in at least some embodiments and at least some operations in a given embodiment can be executed under a hardware-protected secure mode of the chip. Some versions of this kernel also are used to augment public ROM code.

The "security kernel" herein is a software module that executes in secure memory space and implements all or part of the security policy that governs the usage of the secure execution environment and security resources. The security policy includes any one, some, or all of the following: the mechanisms for authenticating code to be loaded and executed inside the secure execution environment, the structure and programming guidelines that such code must comply with, the mechanisms governing basic security building blocks such as key management and secure storage, and all other critical security operations.

A loadable security kernel is advantageously operable even if the only functions that pre-exist in ROM are basic functions that support the secure execution, entry and exit operations supported by the security hardware and functions that authenticate, load, and branch to the loadable security kernel according to the principles, structures and processes described herein. The loadable security kernel advantageously need not be size-constrained because the loadable security kernel can have one or more portions partially loaded at any given time.

If there is a pre-existing, fully featured security kernel programmed into ROM, the loadable security kernel suitably replaces one, some or all of the functions of the security kernel in ROM. The loadable security kernel may reuse some of the preexisting functionality present in the ROM code, such as standard cryptographic algorithms that are not likely to be changed.

The difference between a primary protected application (PPA) and a loadable security kernel is twofold. First, the scope differs. In scope, the primary protected application does not fundamentally modify the basic preexisting security policy implemented in the ROM code, whereas the loadable security kernel takes full control of the security policy. Second, loading mechanisms differ. The processes of loading the security kernel at both at manufacturing or flashing time as well as booting time, so the security kernel can replace or modify even the booting and flashing functions of secure ROM code, are advantageous and different as described herein.

Figure 3:
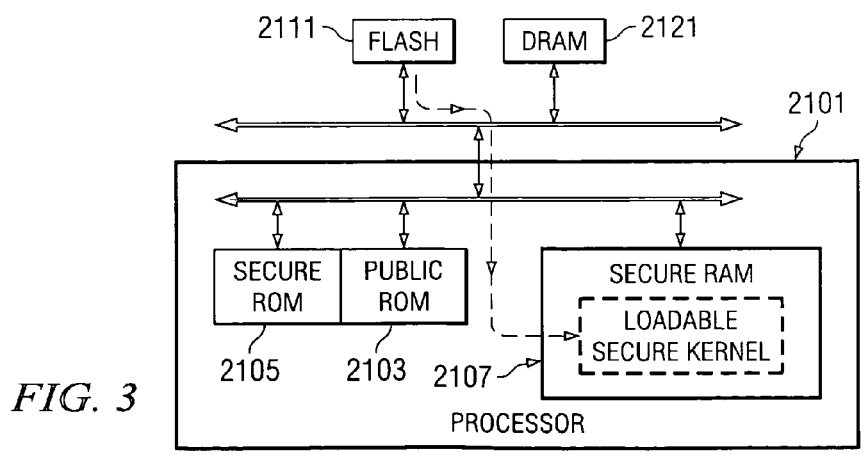
FIG. 3 is a block diagram of memory areas of processors of either FIG. 2A or FIG. 2E, or both, with improved security processes for selectively operating a communications system for improved security.

Secure ROM (Read Only Memory) 2105 code for a processor is burned on-chip in processor 2101 of FIG. 3 and has a lot of security code. Such code, by nature constitutes an execution risk. Every discovery of a security flaw (or someone hacks the code), calls for a new version of the chip, which is very expensive and time consuming. This invention disclosure describes a loadable security kernel, which can be used on Texas Instruments Incorporated OMAP™ processors and other devices with minimal ROM code changes. This loadable kernel in a first processor example is used to fix security holes or introduce new security functionality with ease without needing to re-spin a chip.

Moreover, the on-chip Public ROM 2103 code has code for flashing/booting the device. Here, code fixes again result in a respin of the chip. In this invention disclosure, we also propose an architecture for a loadable kernel for a processor device, which is used to substitute for the Public ROM code and do flashing/booting (and at the same time also incorporate the loadable security kernel features.)

The Loadable Security Kernel (LK, or S-KERNEL) for a processor is implemented, for example in a first processor example with existent ROM code, by applying and using the following changes to the processor ROM code. A "hook" is additional code that adds a feature or supplies entry points and/or branches that implement additional functionality. The phrase "code hook(s)" is used to convey the advantage that a convenient and even minimal code change enables ROM code to cause loading of the loadable kernel, and enable flashing and/or booting using the loadable kernel.

Changes in Flashing Sequence—
After the flash code is downloaded the following steps are performed:
Search for S-KERNEL (using toc_search_item( ))
If found
Load Speedup
Import Keys
Authenticate Image using hw_ext_code_check( ) with an extra parameter
Inside sec_rom_ext_code_check( ), which corresponds to hw_ext_code_check( ),
If authentication is successful and extra parameter is present
Set a secure RAM variable sec_kernel_present (also called LK_Present)
Load the kernel at address "X" inside secure RAM
Continue with Normal flow
Search for Flash Loader (designated $2^{ND}$) and continue
(Part of Normal Flow) The Flash Loader is software in the apparatus (such as a wireless handset) that loads software external to the apparatus via a serial interface (SSI, UART, or USB) into a flash memory in the apparatus.
The new secure kernel will be used if present as follows:
Further calls into the secure mode take the sequence
Hw_sec_pub_dispatcher( )→hw_sec_pub_bridge( )→sec_entry_settings( )→Entry Sequence
The entry sequence is modified as follows
Modified entry sequence (CMP=Compare, JNE=Jump on Not Equal, b=Branch)
CMP sec_kernel_present, #1; LK_Present
JNE_sec_rom_entry;
b X;
X is address installed; in hw_ext_code_xheck( )
In the above flow, if the new secure kernel is present, we jump to that kernel (it has its own secure entry function at its beginning) and all corresponding functions will be executed inside the kernel.

Thus with this example of just a few changes to the current ROM code, advantageously load a new secure kernel during flashing and continue with the flashing procedure after that.

Booting Sequence—
The booting sequence modification is very similar and is done after a NAND/NOR check of flash memory 111 type as NAND flash or NOR flash.
Interrupts
Interrupts get mapped to a predetermined address A which then gets mapped into the vectors in Secure ROM. This is changed. In the hw_ext_code_check, also set a variable Y. Vectors in Secure ROM branch to a different address (Secure RAM interrupts) if Y has been set. These branches are far-pointer branches. Far-pointer branches branch to code outside a local code segment. In this case, branching between portions of secure ROM code, and loadable kernel in secure RAM, and branching between other portions and locations is provided as appropriate to accomplish any improved functions which particular code provided in the loadable kernel confers.
Size Constraints
If Secure RAM 2107 size is minimal, the loadable kernel model is given the following support
Demand Paging scheme
Stacked DRAM 2121 support
Another interesting solution is to keep only those portions of code which are suspected to be incorrect in the Loadable kernel. All correct code can be accessed directly from the ROM (using a jump table like mechanism)
Loadable kernel in a second processor example for flashing, booting (Public ROM) and security
The hereinabove loadable kernel in a first processor example was primarily for the security related code. In a second processor example, it is possible to architect a loadable kernel, which also substitutes the Public ROM code (which does flashing/booting) and contains the security code too. This is very highly desirable as it results in a very thin layer of code on-chip, which will be very beneficial both in terms of cost and time for development.
Flashing Sequence
When Flashing pin is on, on-chip code starts
On-Chip ROM code enables JTAG (only in the relevant modes) and provides write-protection on the flash memories (and may be any other writeable components).
JTAG is used to download the loadable kernel to SDRAM.
On-Chip ROM Code detects the end of downloading
On-Chip ROM code disables JTAG (in the relevant modes) and removes flash write protection. JTAG bits in SEC-CTRL (Security Control Register) and other registers need to be more than OTC (One Time Change, i.e. writeable once) and the flash protect register should also be more than OTC.
ROM code downloads loadable kernel to Secure RAM and Verifies Loadable Kernel.
Loadable Kernel has 2 entry points:
Flashing Entry Point
Booting Entry Point
Control is passed to Loadable Kernel, which starts the Normal Boot sequence.

Loadable Kernel contains UART/USB drivers etc. It downloads Flash Loader over UART/USB, etc.

Flash Loader has a PA (Protected Application), which copies the loadable Kernel into flash memory.

("PPA" later in this disclosure means "Primary Protected Application" which is a protected application that runs at boot time. "PA" means an application which is protected by secure mode security protections such as hardware-based security monitoring logic 138 and the PA runs either at boot time or at run-time. "JTAG" refers to a type of serial scan interface based on, related to or derived from Joint Test Action Group 1149.1 used in testing operations that is suitably re-used in one type of input mode herein as a serial port for downloading purposes in the flashing operations here.)

Booting Sequence

If boot pin is set, the ROM code looks for the Loadable Kernel in flash memories and if found it verifies the Loadable Kernel and passes control to the Booting entry point of the Loadable Kernel.

This solution as described herein advantageously, among other things, patches the secure entry sequence. The loadable kernel can be used as a full replacement for the Secure ROM Code. Also, it provides a mechanism to patch Public ROM Code (flashing and booting code).

This solution is a fast, efficient, software-only solution which obviates re-spinning chips because of either security or flashing problems.

Solution:

Loadable Security Kernel

Used in case there are problems with Secure ROM

Used in case customer needs flexibility in security solution

Enabled through ROM code hooks

On a first processor example, the security kernel will be additional to the existing Secure ROM On a second processor example, the loadable security kernel may be the only Secure ROM ROM Code Hooks Architecture for First Processor Example Simple hooks in ROM code Loadable kernel can be treated analogous to a PPA but provides greater flexibility than a PPA as it is not just a patching mechanism for portions of secure ROM but is a fully functional Secure ROM replacement right from the secure mode side entry code.

Hooks to deal with

Flashing/Pre-flashing

Boot time

Flashing Hooks

In Flashing sequence (Flash Image contains "$2^{ND}$" and "S-KERNEL")

Public Init

Secure Init

Interface Init

Send ASIC ID

Wait for response

If flashing message, download code

Search for S-KERNEL (using toc_search_item( ))

If found

Load Speedup

Import Keys

Authenticate Image using hw_ext_code_check( ) with an extra parameter

Inside sec_rom_ext_code_check( ), which corresponds to hw_ext_code_check( ),

If authentication is successful and extra parameter is present

Set a secure RAM variable sec_kernel_present (also called LK_Present herein)

Load the kernel at address "X" inside secure RAM

Continue with Normal flow

Search for $2^{ND}$ and continue

The new secure kernel will be used if present as follows

Further calls into the secure mode take the sequence

Hw_sec_pub_dispatcher( )→hw_sec_pub_bridge( )→sec_entry_settings( )→Entry Sequence The entry sequence is modified as follows Modified Entry Sequence

| | | |
|---|---|---|
| CMP | sec_kernel_present, #1 | ; LK_Present |
| JNE | ___sec_rom_entry | ; |
| b | X | ; |

X is address installed; in hw_ext_code_xheck( )

In the above flow, if the new secure kernel is present, we jump to that kernel (it must have its own secure entry function at its beginning) and all corresponding functions will be executed inside the kernel.

Thus with few changes to the current ROM code, we can load a new secure kernel during flashing and continue with the flashing procedure after that.

Booting Hooks

In Booting sequence (Flash Image contains "X-Loader" and "S-KERNEL")

Public Init

Secure Init

NAND/NOR check

Search for S-KERNEL (using toc_search_item( ))

If found

Load Speedup

Import Keys

Authenticate Image using hw_ext_code_check( ) with an extra parameter

Inside sec_rom_ext_code_check( ), which corresponds to hw_ext_code_check( ),

If authentication is successful and extra parameter is present

Set a secure RAM variable sec_kernel_present (also called LK_Present herein)

Load the kernel at address "X" inside secure RAM

Continue with Normal flow

Search for X-Loader and continue

The new secure kernel will be used if present as follows

Further calls into the secure mode take the sequence $Hw_{13}$ sec_pub_dispatcher( )→hw_sec_pub_bridge( )→sec_entry_settings( )→Entry Sequence The entry sequence is modified as follows Modified Entry Sequence

| | | |
|---|---|---|
| CMP | sec_kernel_present, #1 | ; LK_Present |
| JNE | ___sec_rom_entry | ; |
| b | X | ; |

X is address installed in hw_ext_code_xheck( )

In the above flow, if the new secure kernel is present, we jump to that kernel (it must have its own secure entry function at its beginning) and all corresponding functions will be executed inside the kernel.

For SW reset, use the same procedure (secure kernel will have to be loaded)

Thus with few changes to the current ROM code, we can load a new secure kernel during booting and continue with the booting procedure after that.
More on ROM Code Hooks
Alternative
Use a patch hook inside sec_rom_dispatcher( )
Not as efficient as the earlier hook as we cannot control the entry sequence
Interrupt Handling
Interrupts get mapped to predetermined address A, which then gets mapped into the vectors in Secure ROM
This needs to change
In the hw_ext_code_check, we also set a variable Y
Vectors in Secure ROM branch to a different address (Secure RAM interrupts) if Y has been set
These branches need to be far-pointer branches
Example
Vect_TBL:; Vector Table
Vect1: dd Vector_PowerOnReset; This is a 32 bit address which gets loaded to PC
Vect2: dd Vector_UndefinedInstruction; This is a 32 bit address which gets loaded to PC
Vect3: dd Vector_SoftwareInterrupt; This is a 32 bit address which gets loaded to PC
Secure RAM Size Issues
If Secure RAM size is minimal, the loadable kernel model needs the following support
Demand Paging scheme
Stacked DRAM support
How to map the current Secure ROM into Secure RAM if Secure RAM size is limited
If secure RAM size is X, make the loadable kernel of size X/2.
Minimally the loadable kernel should consist of the functions calls implementing the following
ROM API
PPA load functionality, Load Manager and Secure Storage Manager
All other functions can actually be loaded as PAs
Of course needs re-mapping of PA API
Another interesting solution is to keep only those portions of code, which we suspect to be incorrect in the Loadable kernel. All correct code can be accessed directly from the ROM (using a jump table like mechanism)
Flashing and Booting Through Loadable Kernel
The Loadable Kernel Model discussed above was primarily for secure ROM code.
More than this can be done.
Solution
Flashing
When Flashing pin is on, on-chip code starts
On-Chip ROM code enables JTAG (only in the relevant modes) and provides write-protection on the flash memories (and may be any other writeable components).
JTAG is used to download the loadable kernel to SDRAM.
On-Chip ROM Code detects the end of downloading
On-Chip ROM code disables JTAG (in the relevant modes) and removes flash write protection. JTAG bits in SEC-CTRL and other registers need to be more than OTC and the flash protect register should also be more than OTC.
ROM code downloads loadable kernel to Secure RAM and Verifies Loadable Kernel
Loadable Kernel has 2 entry points
Flashing Entry Point
Booting Entry Point
Control is passed to Loadable Kernel, which starts the Normal Boot sequence
Loadable Kernel contains UART/USB drivers etc. downloads Flash Loader over UART USB etc
Flash Loader has a PA, which copies the loadable Kernel into flash memory
Booting Sequence
If boot pin Is set, the ROM code looks for the Loadable Kernel in flash memories and if found verifies the Loadable Kernel passes control to the Booting entry point of the Loadable Kernel Discussion now turns to an asymmetric cryptographic communications process used herein. A Private Key and a Public Key are provided as a private-key, public-key pair for use in the process. These keys are called asymmetric keys. The Private Key is kept secret. The Public Key can be held less-secure. In an asymmetric cryptographic process, a private key is used to decrypt what a public key has encrypted. This is called public key encryption. In the asymmetric process, both the private key or public key can decrypt what the other key has encrypted—encrypt with one key, decrypt with the other key. Both keys can be kept secret and used to establish a confidential channel, but this result can be accomplished with symmetric keys also, at lower cost. Use of asymmetric cryptography herein is advantageous because one of the keys can be disclosed, and that key is called the Public Key.

The Public Key can be used, for instance, in either or both of encryption and signatures. In encryption, the process encrypts with the Public Key and decrypts with the Private Key. Only the person who holds the Private Key can decrypt. By contrast, encrypting a message with the Private Key means that anyone who possesses the Public Key can decrypt the message.

Signatures operate such that only the person who holds the Private Key can sign, and anyone holding the Public Key can verify. However, the Public Key used to verify the signature must be valid. Accordingly, the Public Key is provided in a certificate (see discussion of Device Bound Certificate DBC elsewhere herein) that is generated by a trusted source.

Next, a signing process is described. A signing process at a sending side for signing sensitive data such as device identification data and/or personalization data has steps of:

Hash the data at the sending side to get an original hash value Hash.

Encrypt the hash value Hash (not necessarily the data) with a private key at the sending side. The encryption thwarts a man-in-the-middle attack that changes the data, computes a hash value HashX for that data and then cannot encrypt the hash value HashX because the man-in-the-middle lacks the private key securely possessed by the sending side with which to perform the encryption. The Signature is the encrypted hash value from the sending side. The Signature is transmitted from the sending side along with the data. The data is not necessarily encrypted but can be encrypted as well.

A verification process at a receiving side has steps of:

Hash the data at the receiving side to get a hash value Hash1.

Decrypt the Signature at the receiving side, meaning decrypt the encrypted hash value Hash received from the signing process, with the corresponding public key to get a hash value Hash2 at the receiving side that is presumably the same as the original hash value Hash from the signing process.

If Hash1=Hash2, the Signature is regarded as valid. This is because the receiving side has independently hashed the data to check for a discrepancy indicating a man-in-the-middle attack. The receiving side possesses the public key (that for purposes of the asymmetric process corresponds to but differs from the private key on the sending side) with which to decrypt the original hash value Hash. If Hash1 does not equal Hash2 then the communication received and purporting to be from the sending side is not regarded as valid. Either the Signature is not what was sent by the sending side or the data has been altered prior to reception or both. Either case is regarded as a signature-not-valid situation.

Description now turns specifically to the further Figures.

Figure 4:
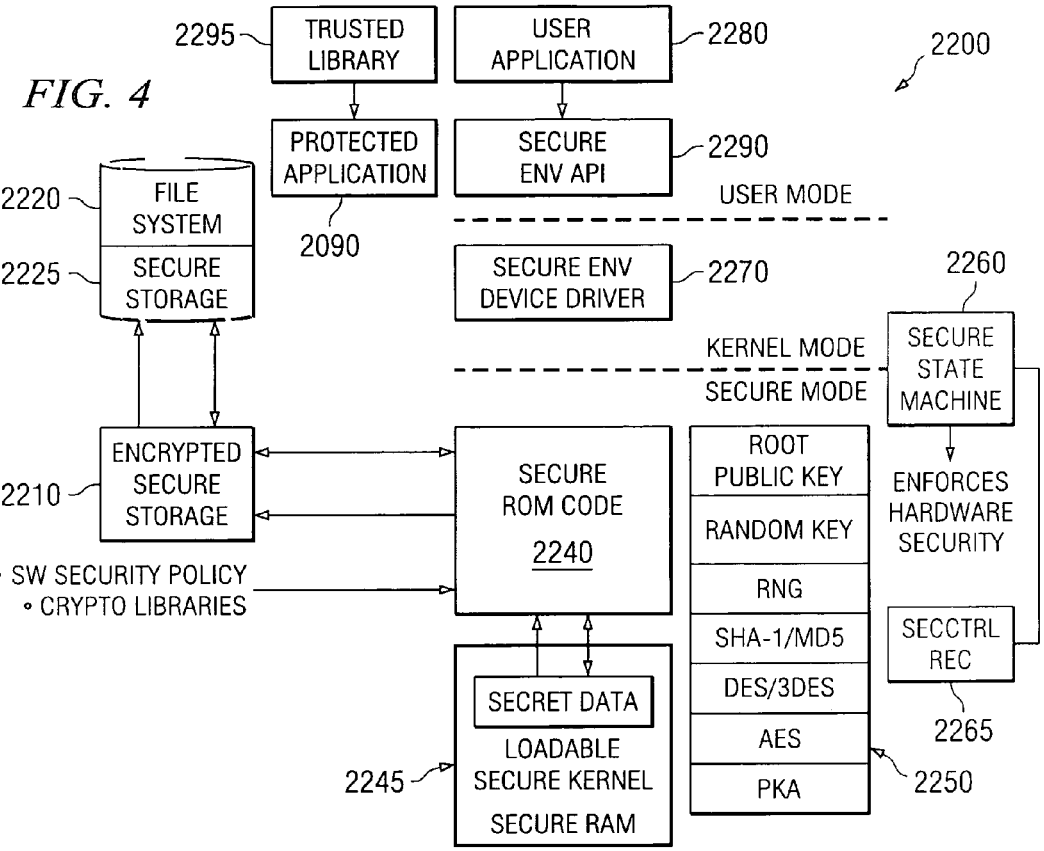
FIG. 4 is a partially block, partially process diagram for improved security using storage areas, a secure state machine and a processor operated by a process having a user mode, a kernel mode, and a secure mode.

FIG. 4 illustrates an advantageous form of software modes and architecture 2200 for the secure apps processor 600. Encrypted secure storage 2210 and a file system 2220 provide storage for this arrangement. Selected contents or all contents of encrypted secure storage 2210 are further stored in a secure storage area 2225.

Next a secure mode area of the architecture is described. In a ROM area of the architecture 2200, secure ROM code 2240 together with secure data such as cryptographic key data are manufactured into an integrated circuit including processor circuitry. Also a secure RAM 2245 is provided. A secure kernel is copied or provided into secure RAM 2245 by operations described herein. Secret data is copied or provided into secure RAM 2245 as a result of processing of secure ROM Code 2240 or the secure kernel or both. Further in the secure mode area are modules for Root Public Key, Random Key, RNG (Random Number Generator), SHA-1/MD5 hashing software and processes, DES/3DES (Data Encryption Standard single and triple-DES) software and processes, AES (Advanced Encryption Standard) software and processes, and PKA (Private Key Authentication) software and processes.

A hardware-implemented secure state machine 2260 monitors the buses, registers, circuitry and operations of the secure mode area of the architecture 2200. In this way, addresses, bits, circuitry inputs and outputs and operations and sequences of operations that violate predetermined secure standards of operation of the secure mode area are detected. The secure state machine 2260 then provides any or all of warning, denial of access to a space, forcing of reset and other protective measures. Use of independent on-chip hardware for secure state machine 2260 advantageously isolates its operations from software-based attacks.

An addressable secure control register (SECCTRL) 2265 with some bits as tabulated in TABLE 1 is provided in secure space.

TABLE 1

| SECURE CONTROL REGISTER BIT/FUNCTION SECCTRL Bit/Function |
| --- |
| SHA-1 hashing module access control register. |
| 0: SHA-1 module access in non-secure mode and secure mode is enabled |
| 1: SHA-1 module access in secure mode only is enabled |
| FLASH LOCK |
| Lock = prevent write access 0: no lock 1: lock |

Secure state machine 2260 monitors busses and other hardware blocks, pin boundary and other parts of the chip for security violations and protects and isolates the protected areas. Secure state machine 2260 makes secure ROM space inaccessible, Security Control Register SECCTRL 2265 inaccessible, and secure RAM space inaccessible and establishes any other appropriate protections to additionally foster security. In one embodiment such a software jump from flash to secure ROM, for instance, causes a security violation wherein, for example, the secure state machine produces an automatic immediate reset of the chip. In another embodiment, such a jump causes the security monitoring logic to produce an error message and a re-vectoring of the jump away from secure ROM. Other security violations would include attempted access to Security Control Register SECCTRL 2265 or attempted access to secure RAM space.

In FIG. 4, a kernel mode part of the software architecture includes one or more secure environment device drivers 2270. Further in FIG. 4, a user application 2280 communicates to and through a secure environment API (application peripheral interface) software module 2290 to the secure environment device driver 2270. Both the user app 2280 and API 2290 are in a user mode part of the software architecture.

If each bit of secure ROM 2240 occupies much less chip real estate than each bit of secure RAM 2245, the skilled worker may prefer to bypass only smaller, selected portions of secure ROM with the security kernel in secure RAM as compared with using the security kernel as a substitute for larger portions of secure ROM code.

Also, the skilled worker appropriately makes architectural tradeoffs between amount of secure RAM space 2245 and processor time spent on memory operations where portions of the secure kernel are swapped in from flash memory to the secure RAM when a limited amount of secure RAM space is available. Accordingly, in some embodiments demand paging is reserved for customer security extensibility and other smaller kernel code blocks. In this way fewer page faults are likely to occur, due to customer security extensibility applications calling into the secure RAM for secure kernel functions. This also means that a cache architecture is more likely to work in an improved manner. Such faults would be limited mostly to customer protected applications which are higher level code calling lower level functions in the secure kernel.

On the other hand, when providing more secure RAM 2245 is more economical than repeatedly redesigning the chip to update secure ROM 2240 code, then the skilled worker may prefer to use larger security kernels and more secure RAM 2245. Accordingly, various embodiments are provided to achieve a variety of advantages in accordance with the competing considerations encountered in particular design environments according to the teachings herein.

In FIG. 5, a target 2310 includes an architecture having at least one less-secure modem processor portion and at least one more-secure apps processor portion. Target 2310 is suitably implemented as in any of FIGS. 1, 2A-2G, 3 and 4 and otherwise as described herein. Target 2310 is coupled to a memory 2320 including a flash or other memory for holding a mobile equipment personalization certificate with, including or accompanied by the secure kernel, secure data, modem software, booting code, flash loader, and other software hereinabove.

In FIG. 5 a host machine 2330 is coupled both to target 2310 and to a secure server 2340. Host machine 2330 provides a Flash Loader and a device bound certificate (DBC) including the personalization information, secure kernel, secure data, modem software, booting code, flash loader, and other software to Target 2310 in response to a public ID from target 2310 and authorization and part or all of the foregoing information, software and data from secure server 2340.

In FIG. 5, there is suitably provided a separate asymmetric cryptographic communications process at flashing time wherein the Private Key of that asymmetric process is an OEM key held privately at OEM original equipment manufacturer, and the Public Key of that asymmetric process is manufactured into or sent down to apps processor and called a Root Public Key for verifying the device bound certificate DBC and thus software integrity at flashing time by apps processor.

While flashing the device, the DBC is created at or supplied through host machine 2330 with the hash of the BootStrap and the Modem Software and the IMEI certificate and provided with a Signature as the encrypted hash value of BootStrap, Modem Software and IMEI certificate combined or multiple encrypted hash values from hashes of various parts of the foregoing. The Private Key of the asymmetric process is used for encrypting to provide the Signature.

In the flashing asymmetric process, the device bound certificate (DBC) suitably carries information in secure form for manufacturing the system components of FIG. 1 and originally loading, testing and running each system component 110, 110', 150, 160, 180, 190. The process of manufacture is described further in connection with FIG. 5 and FIGS. 6A, 6B, 6C and elsewhere herein. The DBC includes a Public Chip ID identifying the chip. This Public Chip ID is public identification information derived from but not necessarily identical to a device unique key for the chip. A creator ID identifies the manufacturer such as an original equipment manufacturer (OEM). An application ID identifies the application. Next in the DBC is a hash of the security kernel, bootstrap code and software certificate. Further provided is a hash of the modem software and software certificate. The DBC includes an IMEI certificate, such as an encrypted IMEI for a cellular telephone handset. An HMAC hash message authentication code further protects the device bound certificate DBC.

In an example of operations at flashing time, write-protecting flash memory at the target 2310 is performed to prevent an attack scenario wherein the flash memory is accidentally or unauthorizedly modified around the time of downloading. Downloading puts the certificate in a temporary space, such as elsewhere than in flash memory temporarily, so that the certificate can be authenticated. The information in the certificate other than the signature may either 1) be in the clear or 2) have been encrypted. Removing the write-protect is performed after successful authentication, and after re-signing locally, in preparation for writing the re-signed information to flash. If the information was 2) received encrypted, there may be decryption and re-encryption prior to re-signing locally. Then the re-signed information is actually written to flash and that space in flash is once-again write-protected to prevent accidental or unauthorized modification of the contents.

In FIG. 6A, flashing operations 2400 of target 2310 of FIG. 5 commence with a START 2410. Operations proceed to determine at a step 2420 whether a flashing pin 2312 of target 2310 is active. If not, operations reach an END 2430. If flashing pin 2312 is active, then operations proceed to enter secure mode by a secure mode entry sequence 2440. Then, in a step 2450, public space initialization in the target, secure space initialization, and interface initialization in the target are performed.

Next, a step 2460 determines whether an input mode is activated for purposes of flashing. If not, operations go to an END 2470. If input mode is activated, operations proceed to a step 2480 to read the Input Mode as JTAG (serial testability interface), USB (Universal Serial Bus), UART (Universal Asynchronous Receiver Transmitter), SSI serial interface, Bluetooth (short distance wireless interface), or other type of interface for input.

In FIG. 6A, a step 2490 enables write protection on flash memory such as by setting a Flash Lock bit to one (1) in security control register SECCTRL, so that flash is not written until the authorized flashing process so directs. Then, to request download, a step 2510 sends a Unit ID, such as a public ID based on the IMEI (International Mobile Equipment Identification) number, from the target 2310 of FIG. 5 to the Host Machine 2330 and so on as described in connection with FIG. 5. A step 2520 determines whether a responsive flashing message is then received from the Host Machine 2330. If not, an END 2530 is reached. If a responsive flashing message is received, then operations go to FIG. 6B step 2540.

In FIG. 6B, a step 2540 proceeds to download the loadable security kernel to a volatile memory (such as DRAM, SRAM, etc.) via the Input Mode from step 2480. Upon completion of download, operations proceed to a step 2550 to disable the Input Mode and remove flash memory write protection (reset Flash Lock bit to zero (0) in security control register SECCTRL) so that flash memory can be written.

Then a step 2560 performs a Table of Contents (TOC) search for the security kernel that presumably has been downloaded. A TOC entry includes, for instance an address offset of a described item from the TOC, a size in bytes of the item, a title string, and a TOC end address of the item. The flashing operations check to see if the host has a valid TOC or other suitable information representing security kernel associated with the flashing code.

If the security kernel is found, as determined by a step 2570, then a step 2580 loads a speedup and imports cryptographic keys. Speedup refers to a set of configuring values programmed into registers to configure the registers and the system specifically for boot and thereby to speed-up the booting process. Importing keys means to recover and transfer into the Secure RAM the cryptographic keys present in a key certificate part of the device bound certificate (DBC).

Further in FIG. 6B, a step 2590 in target 2310 next proceeds to authenticate the downloaded image received from Host Machine 2330. This authentication 2590 suitably involves hashing and decryption of Signature with Public Key at the target 2310, followed additionally by hash value checking for signature verification and by any other appropriate verification, and decryption of the downloaded image and specific checking of the loadable security kernel portion in connection with at least one extra parameter such as LK_Present and any suitable additional parameters if introduced or selected. Thus, if the kernel is found, the image is authenticated using hw_ext_code_check( ) with an extra parameter. The process signified by hw_ext_code_check( ) is a Signature verification process as described earlier hereinabove.

A further decision step 2610 determines whether the authentication was successful and the at least one extra parameter(s) is/are present. If so, the operations proceed to a step 2620 of FIG. 6C.

Figure 6C:
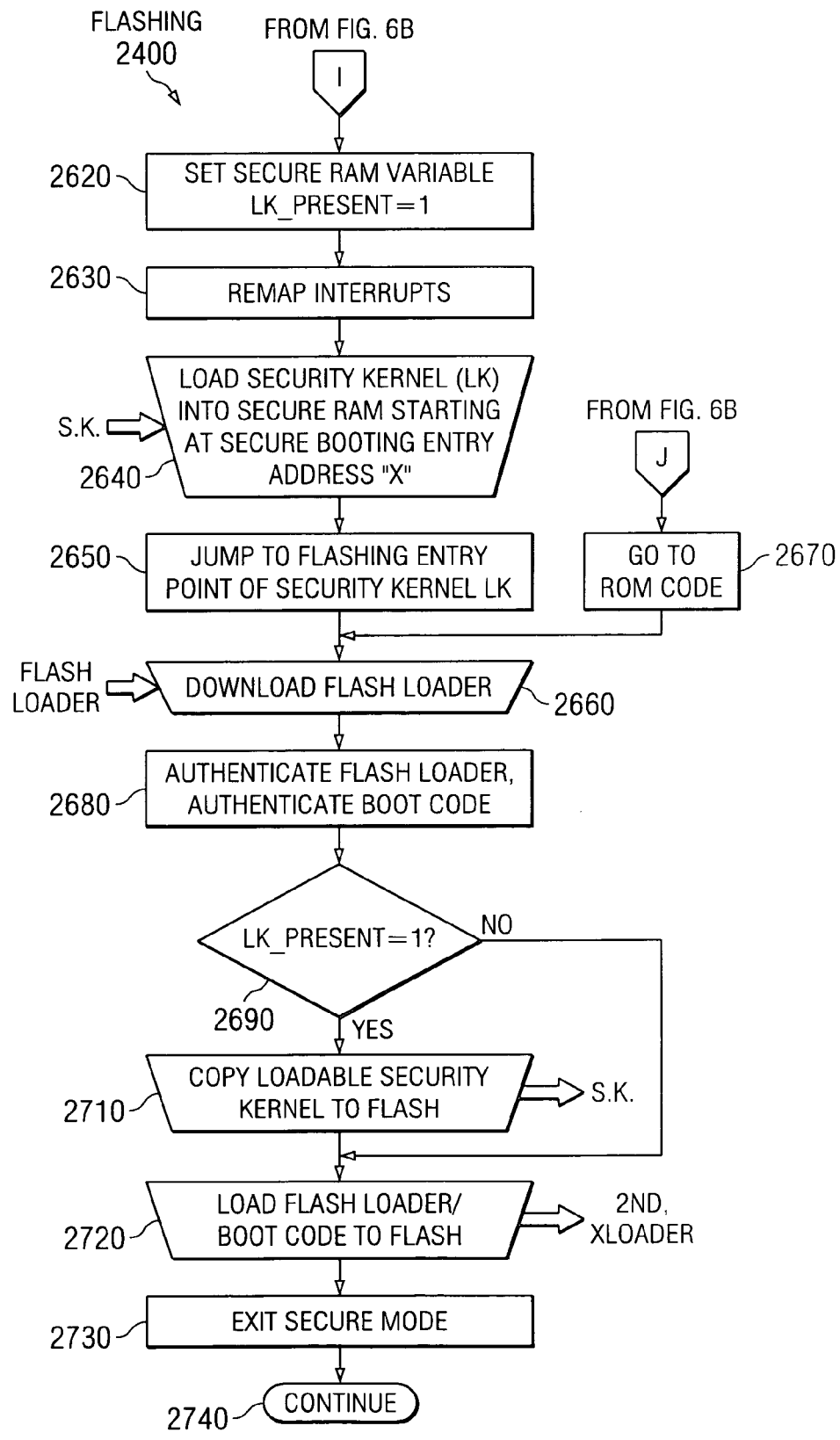

In FIG. 6C, operations proceed in step 2620 to set variable LK_Present pertaining to secure RAM space. The variable LK_Present is also called an extra parameter and is suitably located in secure memory. The extra parameter LK_Present represents and conveys the information that a loadable kernel is present. Step 2620 sets variable LK_Present to an active state (e.g. one (1)). Then interrupts are remapped in a step 2630 since the secure kernel is present and interrupts are suitably handled differently than without secure kernel present.

A subsequent step 2640 then loads the security kernel from the volatile memory into which it was initially downloaded in step 2540, and into secure RAM space starting at a predetermined secure booting entry address "X." The operation is suitably defined in various embodiments to either load the entire security kernel into secure RAM or to load the security kernel piecemeal in a series of steps. The loadable kernel in step 2640 is loaded into the secure RAM to have a starting point "X" to enhance security. In this way, a jump to starting point "X" fails unless the kernel has actually been moved in the memory or copied from a memory space to that starting point "X" in secure RAM. The loadable kernel or portion thereof is loaded, transferred, copied, positioned, re-positioned, placed, displaced, moved, shifted in location, or any combination of these. The word "transfer" for this purpose means any one or some or all of the foregoing operations. The transferring moves (moves includes copying here) the loadable security kernel in memory space provided the authenticating is successful so that the loadable security kernel is in a secure writable portion (e.g. secure RAM) of the memory space. Then the process utilizes the processor to jump to a predetermined location "X" in the secure writable portion of the memory space. The predetermined location coincides with the flashing entry point of the security kernel as moved. In general, the operation provides a way of arranging operations so that the jump would either not occur at all or would occur to an inoperative or trapped point other than the actual flashing entry point of the loadable kernel prior to a secure operation conditioned on authentication rearranging the jump and/or the kernel relative to each other directly or indirectly so that the jump goes directly or indirectly to a predetermined point which coincides with the actual flashing entry point of the loadable kernel subsequent to that secure operation.

Because the security kernel redefines some or all of the secure ROM code, operations are now suitably made to jump to a flashing entry point of the security kernel. The flashing entry point in some embodiments is the same as the booting entry address "X" and in other embodiments is established to be a different entry point in the security kernel. For generality, the distinct terminology of "flashing entry point" is given the address to which operations branch in step 2650.

In FIG. 6C, operations in the security kernel proceed to a step 2660 to download a flash loader from the Host Machine 2330 of FIG. 6. Also, note in FIG. 6B that if the security kernel was not found in step 2570 or it was found and authentication and/or extra parameters failed in step 2610, then operations branch from step 2570 and 2610 to go to original ROM code in a step 2670 that is unmodified and un-replaced by the security kernel. Both steps 2650 and 2670 are shown going next to step 2660 and subsequent operations.

It is to be understood that the step 2660 and subsequent operations will in general be different as between the original ROM code and the security kernel due to the improvements of the security kernel in authentication, cryptographic operations, overcoming hacking scenarios, and so on. For compactness on the drawing, only some differences are shown but in actuality there may be some or many differences and the specific flow diagrams of particular embodiments may be, or will be, more differentiated between the operations initiated by step 2670 and those initiated by step 2650.

In step 2660, the flash loader (e.g., "$2^{ND}$") is downloaded. Then a step 2680 authenticates the flash loader, and authenticates boot code. Next, a step 2690 determines whether the security kernel is present by checking the LK_Present variable for the value unity (1). If the security kernel is present, then operations go from step 2690 to a step 2710 to copy the security kernel to flash memory so that it will be in a non-volatile form and thereby survive subsequent power-down of the target. The flash memory is then locked to write-protect the security kernel by setting the Flash Lock bit to one (1) in security control register SECCTRL. Note that in different embodiments, one or more portions or all parts of the flash memory are locked by providing suitable one or more Flash Lock bits in the security control register SECCTRL to activate security monitoring logic 138 to monitor the address bus for addresses pertaining to the corresponding write-protected address ranges in flash memory and prevent completion of a write to a respective write-protected address range when a corresponding Flash Lock bit is set to one (1).

After step 2710, operations go to a step 2720. If variable LK_Present is zero because the security kernel is not present or not entirely present at step 2690, then operations also go from step 2690 to step 2720. In secure ROM code where no variable LK_Present is involved, the operations lack the variable LK_Present and lack the determination step 2690 and implicitly proceed in the manner contemplated here.

In FIG. 6C, step 2720 also loads the boot code to flash memory and also loads flash loader code to flash if and as appropriate to intended applications of the target.

Next, a step 2730 performs operations to exit secure mode. Exit from Secure mode at step 2730 makes secure ROM space inaccessible, Security Control Register SECCTRL inaccessible, and secure RAM space inaccessible and establishes any other appropriate protections to additionally foster security. In some embodiments, any subsequent attempts to enter secure mode, even by the special Secure mode entry sequence of instructions and/or data, is detected as a security violation and protective measures follow immediately.

After step 2730 exit from secure mode, a Continue 2740 proceeds to a boot routine, or to other operations as desired.

Figure 7A:
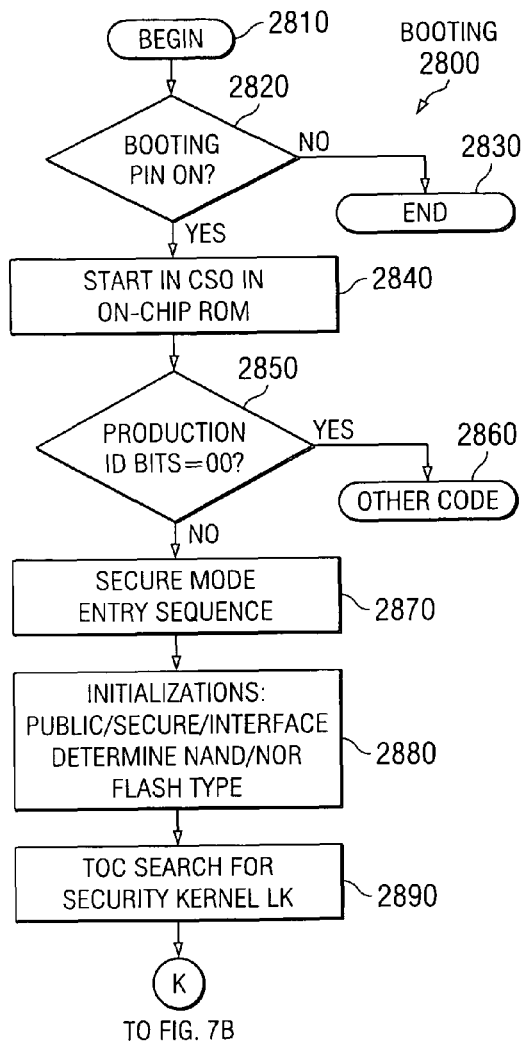

Turning to an improved process of booting, FIG. 7A shows booting 2800 commencing with a BEGIN 2810. BEGIN 2810 suitably represents any of 1) a power-up hardware START, 2) a software warm reset, 3) a continuing operation proceeding from Continue 2740 of FIG. 6C, or 4) any other suitable BEGIN. Operations proceed from BEGIN 2810 to a step 2820 to determine whether the booting pin 2316 is activated at the target in FIG. 5. References to "activated" equally pertain to low-active grounding, to high-active connection to power supply, and to activation from a controlling output of a logic circuit. "Flashing pin" and "Booting pin" each equally pertain to a physical integrated circuit pin, or to a non-volatile element such as an E-fuse, or to a logic input coupled to controlling logic circuitry in various embodiments.

In FIG. 7A, where the booting pin is not on, not activated, then operations go to an END 2830. Where the booting pin is activated (on), then operations proceed to a step 2840 to start executing further booting instructions in on-chip ROM, e.g., in the memory space CS0 (chip-select zero). Next a step 2850 determines whether certain Production ID bits, such as certain E-fuse bits, have a predetermined value such as "00." If yes, then operations go to Other Code 2860 such as a selectable lower-security option. If no, then operations go from step 2850 to a step 2870 and execute a secure mode entry sequence.

In secure mode, initializations 2880 include public initialization, secure initialization, and interface initialization. Flash memory is checked to determine what spaces are NAND flash, what spaces are NOR flash, and any flash subtypes of flash memory. Then a step 2890 performs a Table of Contents (TOC) search for presence of the loadable security kernel and operations go to FIG. 7B.

A TOC entry includes, for instance an address offset of a described item from the TOC, a size in bytes of the item, a title string, and a TOC end address of the item. For one example, the boot operations search the peripherals by querying the interfaces for a signal that a host is trying to boot the system and checks to see if the host has a valid TOC or other suitable information representing acceptable boot code. If no prospect for boot through a peripheral is found, then the external memory interfaces for NAND and/or NOR flash memory are accessed to detect a TOC with valid information. Alternatively, the flash is accessed for other suitable information representing acceptable boot code, but the example description of this paragraph is based on the TOC approach for conciseness. If no valid boot prospect is found, the system takes appropriate default action such as a warm reset. If a valid boot prospect is found, memory booting or peripheral booting occurs as appropriate and as described further in connection with FIG. 7B.

Figure 7B:
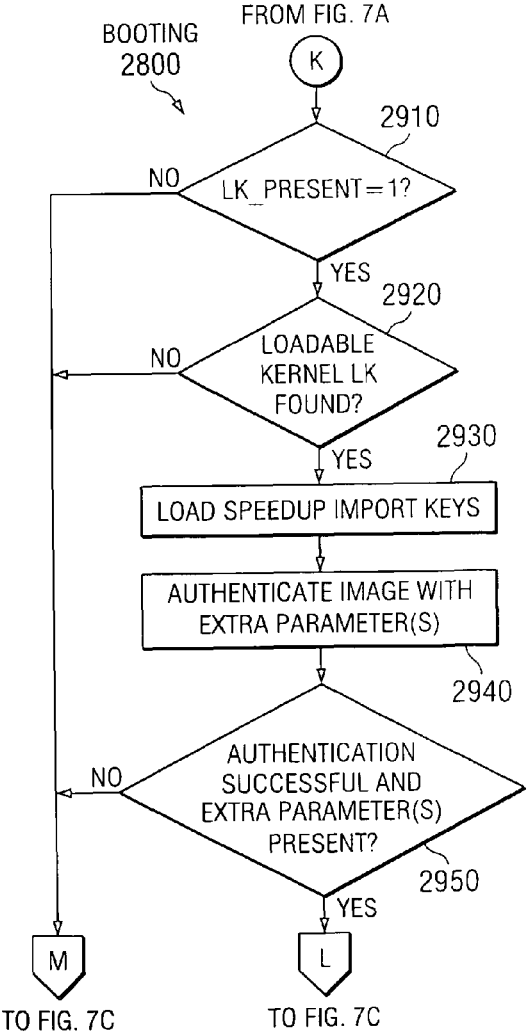

In FIG. 7B, a step 2910 determines whether the variable LK_Present equals one (1), where this variable is available for testing. If LK_Present equals one, then a step 2920 determines whether the loadable security kernel LK is present in the TOC search.

If security kernel LK is present in the TOC search, then operations go to a step 2930 to load a speedup and import cryptographic keys. Next a step 2940 authenticates the boot image in flash including the security kernel. Step 2940 also looks for at least one extra parameter such as LK_Present and any suitable additional parameters if introduced or selected. Thus, if the kernel is found, the image is authenticated using hw_ext_code_check( ) with an extra parameter. The process signified by hw_ext_code_check( ) is a Signature verification process as described earlier hereinabove. Then a decision step 2950 determines whether authentication is successful and the extra parameter(s) is/are present. Operations next proceed to FIG. 7C.

In FIG. 7C, if authentication and parameters are satisfactory, then operations go to a step 2960 to set the variable LK_Present to one, representing that secure RAM has the security kernel. Then a step 2970 remaps interrupts to accommodate the security kernel since the security kernel is present.

Further step 2980 loads the security kernel into secure RAM starting at secure booting entry address "X." The loadable kernel in step 2980 is loaded into the secure RAM to have a starting point "X" to enhance security. In this way, a jump to starting point "X" fails unless the kernel has actually been moved in the memory or copied from a memory space to that starting point "X" in secure RAM. The loadable kernel or portion thereof is loaded, transferred, copied, positioned, repositioned, placed, displaced, moved, shifted in location, or any combination of these. The word "transfer" for this purpose means any one some or all of the foregoing operations. The transferring moves (moves includes copying here) the loadable security kernel in memory space provided the authenticating is successful so that the loadable security kernel is in a secure writable portion (e.g. secure RAM) of the memory space. Then the process utilizes the processor to jump to a predetermined location "X" in the secure writable portion of the memory space. In step 2980, the predetermined location coincides with the booting entry point of the security kernel as moved. In general, the operation provides a way of arranging operations so that the jump would either not occur at all or would occur to an inoperative or trapped point other than the actual booting entry point of the loadable kernel prior to a secure operation conditioned on authentication rearranging the jump and/or the kernel relative to each other directly or indirectly so that the jump goes directly or indirectly to a predetermined point which coincides with the actual booting entry point of the loadable kernel subsequent to that secure operation. Step 2980 makes the secure RAM actually have the security kernel in correspondence to the representation of LK_Present equals one made in step 2960.

It is apparent that it is feasible in different embodiments to provide some variation in the order of operations shown. Also, where booting of FIGS. 7A, 7B, 7C immediately follows flashing of FIGS. 6A, 6B, 6C without a power-down, then a flag can be set to bypass some steps that have already been performed in flashing, such as one or more of steps 2960, 2970, 2980.

Next in FIG. 7C, a step 2990 makes operations jump to the booting entry point address "X" in the secure RAM and execute the security kernel.

Note in FIG. 7B, that where LK_Present is not one in step 2910 or loadable kernel LK is not found in step 2920, or where authentication and extra parameter(s) do not all successfully check out in step 2950, then operations branch from any of those steps 2910, 2920, 2950 to a step 3010 in FIG. 7C. In step 3010, operations are made to jump to a secure ROM booting entry address and perform boot operations as established therein.

Further in FIG. 7C, operations go from steps 2990 and 3010 to a step 3020 to exit secure mode. After step 3020, operations proceed to Continue 3030. Continue 3030 is suitably any of 1) run-time, 2) further boot operations outside of secure mode, or 3) any other suitable operations.

FIGS. 1, 2A, 2E, 3, 4, 5 and 7A, 7B, 7C thus show electronic apparatus including a processor, a first readable non-volatile memory coupled to said processor and holding a loadable security kernel having a booting entry point, and a memory space coupled to said processor including a secure writable portion. The processor is operable to read the loadable security kernel from the first readable non-volatile memory into the memory space, which in some embodiments is the secure writeable portion. The processor authenticates the loadable security kernel, moves the loadable security kernel in the memory space provided the authenticating is successful so that the loadable security kernel is in the secure writable portion of the memory space, and jumps to a predetermined location in the secure writable portion of the memory space. The predetermined location coincides with the booting entry point of the security kernel as moved.

In FIG. 8, the discussion turns to Run-Time operations 3100. These operations commence with a BEGIN 3110. BEGIN 3110 suitably represents any of 1) a continuation of operations after Continue 3030 of FIG. 7B, 2) a restart of Run-Time operations without need of rebooting, or 3) other suitable instance of commencing Run-Time operations.

After BEGIN 3110, a step 3120 performs various run-time operations outside of secure mode, such as executing various user applications and system applications. Some applications, or contingencies in applications, require access to secure mode for their proper execution and completion. In such case, operations proceed to do a secure mode entry sequence.

One or more protected applications as in FIG. 8 provide an interface for FIG. 4 between user application 2280 and information in file system 2220, secure storage 2225, and a trusted library 2295 such as an authenticated library of software for the system.

The security state monitor logic 2260 of FIG. 4 is arranged in its hardware monitoring function correspondingly to detect whatever that Secure mode entry sequence of instructions and/or data has been established to be. When this Secure mode entry sequence of instructions and/or data has been established in the correct authorized manner acceptable to the security state logic 2260, the code enters secure mode. No user application operates at this time because secure code is executed, not user application code.

In FIG. 8, the sequence suitably includes a step 3130 to call a hardware security public dispatcher software module. Then a step in the sequence runs a hardware security public bridge 3140. Then a step 3150 establishes security entry settings for the entry into secure mode.

Advantageously, a further step 3160 tests the value of the variable LK_Present to determine if the loadable security kernel is present. If the value is unity (1), the security kernel is present and operations go to a step 3170. If the value is zero (0) or not unity, the security kernel is not present and operations go to a step 3180 to jump to a secure ROM entry address and perform operations unmodified by the security kernel.

Where the security kernel is present, then step 3170 instead causes operations to jump to the secure RAM predetermined entry point address "X" and commence executing the security kernel. The security kernel is suitably constituted so that where operations of the security kernel at run-time (FIG. 8) appropriately differ from operations of the security kernel during flashing (FIGS. 6A, 6B, 6C) or during boot (FIGS. 7A, 7B, 7C), then flags are set or appropriate determinations invoke the appropriate modified and improved operations which the security kernel provides.

After either of steps 3170 and 3180, operations proceed to a step 3190 to exit the secure mode. Upon exit of secure mode, operations reach a Continue 3195 whereupon further Run-Time operations outside of secure mode, or other appropriate operations are provided.

The system of FIGS. 2A-2G is suitably provided on several chips—one chip per processor and modem block of the illustration. In other embodiments, two or more or all of the blocks are integrated onto the same chip so that the system is provided in four, three, or two chips of a multi-chip system. In the most highly integrated form, one single integrated circuit chip has cores or regions as shown in FIGS. 2A-2G.

In other embodiments the various steps of a secure processor in FIG. 4 are suitably established and performed by one, two, or more secure processor blocks. Also, the various structures and steps of a processor outside secure mode are suitably established and performed by the same blocks or additionally by one, two, or more less-secure processor blocks.

The loadable kernel is suitably provided as one, two or more kernels that have either a single variable LK_Present or plural variables LK1_Present, LK2_Present, etc. Also, a single TOC entry or multiple TOC entries for multiple kernels are suitably provided as well. The kernels, variables and TOC entries are suitably processed serially or in parallel, and individually or collectively. The kernels, variables and TOC entries are suitably allocated to one or more different more-secure processor blocks and/or one or more different less-secure processor blocks for processing.

A few preferred embodiments have been described in detail hereinabove. It is to be understood that the scope of the invention comprehends embodiments different from those described yet within the inventive scope. Microprocessor and microcomputer are synonymous herein. Processing circuitry comprehends digital, analog and mixed signal (digital/analog) integrated circuits, ASIC circuits, PALs, PLAs, decoders, memories, non-software based processors, and other circuitry, and digital computers including microprocessors and microcomputers of any architecture, or combinations thereof. Internal and external couplings and connections can be ohmic, capacitive, direct or indirect via intervening circuits or otherwise as desirable. Implementation is contemplated in discrete components or one or more fully integrated circuits in any materials family and combinations thereof. Various embodiments of the invention employ hardware, software or firmware and combinations of any of them. Process diagrams herein are representative of flow diagrams for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in either the detailed description and the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. A method for improved security for a processor comprising the steps of:
   first, downloading a loadable security kernel to a memory space of the processor;
   second, authenticating the loadable security kernel;
   third, only if the authentication is successful, transferring the kernel from the memory space to a secure writeable memory so that the kernel begins at a predetermined address inside the secure writeable memory, wherein the secure writeable memory is separate from the memory space;
   fourth, in a secure mode, executing a set of code in a secure memory, the executing step comprising detecting whether the kernel has been transferred inside the secure writeable memory; and
   fifth, executing the kernel if the fourth step determines the kernel has been transferred inside the secure writeable memory.

2. The method of claim 1 wherein the secure memory comprises on-chip pre-existing ROM code and the step of executing the kernel includes executing code in the kernel instead of a portion of the pre-existing ROM code, whereby changes and upgrades to the pre-existing ROM code are implemented in the kernel.

3. The method of claim 1 wherein the processor has a flash memory associated therewith and the kernel includes flashing code representing a process of loading an image into the flash memory.

4. The method of claim 1 wherein the kernel includes code for booting the processor.

5. A device for improved security comprising:
   a processor;
   a secure writeable memory coupled to said processor and including code to download a loadable security kernel to a memory space of the processor, authenticate the loadable security kernel, and only if the authentication is successful to transfer the kernel from the memory space to the secure writeable memory so that the kernel begins at a predetermined address inside the secure writeable memory; and
   a secure memory space having code operable in a secure mode to detect whether the kernel has been transferred inside the secure writeable memory and, responsive to detecting that the kernel has been transferred inside the secure writeable memory, to jump to the kernel to execute the kernel.

6. The device of claim 5 wherein said secure memory space includes a ROM and said code includes ROM code.

7. The device of claim 5 wherein the secure memory space has first code and second code, the second code operable to bypass a portion of the first code and execute in place of the first code the kernel, whereby changes and upgrades to the first code are implemented in the kernel.

8. The device of claim 5 further comprising a flash memory coupled to said processor.

9. The device of claim 8 wherein said secure writeable memory includes flashing code to load the loadable security kernel into said flash memory.

10. The device of claim 5 wherein said kernel includes boot code and said processor is further responsive to the kernel to execute at least some of the kernel boot code.

11. The device of claim 10 further comprising security monitoring logic coupled to monitor said processor.

12. The device of claim 5 further comprising a device coupled to said processor, said device selected from the group consisting of 1) handheld device, 2) personal computer, 3) digital subscriber line (DSL) telecommunication unit, 4) wireless local area network (WLAN) device, 5) gateway unit, 6) wireless base station.

13. The device of claim 5 further comprising a radio frequency unit responsive to said processor.

* * * * *